(12) United States Patent
Szeto

(10) Patent No.: US 7,499,837 B2
(45) Date of Patent: Mar. 3, 2009

(54) METHOD OF GENERATING SAMPLE DATA FROM A COMPUTERIZED MODEL USING ACOUSTIC SIMULATIONS

(76) Inventor: Roque Szeto, P.O. Box 2667, Palos Verdes Peninsula, CA (US) 90274

( * ) Notice: Subject to any disclaimer, the term of this patent is extended or adjusted under 35 U.S.C. 154(b) by 0 days.

(21) Appl. No.: 11/550,314

(22) Filed: Oct. 17, 2006

(65) Prior Publication Data

US 2007/0150232 A1 Jun. 28, 2007

Related U.S. Application Data

(60) Provisional application No. 60/727,795, filed on Oct. 17, 2005.

(51) Int. Cl.
*G06F 15/00* (2006.01)

(52) U.S. Cl. ........................................ 702/196

(58) Field of Classification Search ................ 702/54, 702/65, 66, 75, 77, 83, 103, 171, 183, 196; 703/2, 6

See application file for complete search history.

(56) References Cited

U.S. PATENT DOCUMENTS

2004/0196738 A1* 10/2004 Tal-Ezer .................. 367/51

OTHER PUBLICATIONS

Valeria Simoncini and Daniel B. Szyld, Flexible inner-outer Krylov subspace methods. 2003. Society for industrial and Applied Mathematics, vol. 40, pp. 2219-2239.*

* cited by examiner

*Primary Examiner*—Edward Raymond
*Assistant Examiner*—Mohamed Charioui
(74) *Attorney, Agent, or Firm*—Connolly Bove Lodge & Hutz LLP

(57) ABSTRACT

A method of generating sample data from a computerized model of a mass using acoustic simulations is disclosed. Initially, a computerized model of the mass is created based upon information that is known about the mass. The computerized model is divided into a plurality of layers, each layer representing physical features of the mass. Each layer is thereafter characterized by a propagation wavenumber. Acoustic wave equations for the layered model are then solved using a multi-level generalized minimal residual (GMRES) algorithm. The solved wave equations are employed to simulate acoustic data which is saved in an electronic memory for future use.

8 Claims, 23 Drawing Sheets

METHOD OF GENERATING SAMPLE DATA FROM A COMPUTERIZED MODEL USING ACOUSTIC SIMULATIONS

PRIORITY

Priority is claimed to U.S. Provisional Patent Application Ser. No. 60/727,795, filed on Oct. 17, 2005, the disclosure of which is incorporated herein by reference.

BACKGROUND OF THE INVENTION

1. Field of the Invention

The field of the present invention is sample data creation from computerized modeling, particularly where the computerized model is based upon a mass, or a portion of a mass, and is usable as a tool to indirectly examine the mass through the use of acoustics.

2. Background

Computerized modeling is used in many different disciplines for different purposes. One use of computerized modeling is to identify the interior features of a mass. The mass may be any volume having features of interest which are not readily discernable because they are hidden from direct observation. Instead, the features of interest are susceptible to indirect methods of examination using acoustics. For example, in geophysics, the mass may be an oil well, a water table, or any other geophysical feature. In medicine, the mass is a human or animal body.

To identify physical features within the mass, it is well known to direct acoustic energy into the mass and to collect data as the acoustic energy emerges from the mass. That acoustic data, together with other sources of information, may be used to construct an initial computerized model of the mass. The process of creating the computerized model is commonly known as imaging or inversion. Once the computerized model is constructed, it may be used to obtain simulated data. The simulated data is then compared to the actual data obtained from the mass to determine the accuracy of the model.

The simulated data is most often obtained by finding a numerical solution to the acoustic wave equation using different approximation methods. One such approximation method is commonly referred to as high frequency approximation, or ray tracing. Ray tracing is found in everyday engineering and scientific community across disciplines, especially those in optics and in acoustics. It is based on the geometrical optics high temporal frequency approximation that the size of the object is much greater than the wavelength of propagation. For applications in which such approximations are not valid, the ray tracing solution produces non-physical caustics, singularities, and shadow zones. Further, for applications in which solutions are desired for a wide range of temporal frequency values, the ray tracing method has questionable value.

A second approximation method is commonly referred to as parabolic approximation, or a one-way wave equation. This method can also be found in many scientific and engineering disciplines, and is particularly useful for those instances in which the effects of backscattering can be neglected. Such approximations are valid for most optical propagation and underwater acoustics applications. However, the accuracy of such approximations is questionable in most geophysical applications and in other acoustical problems such as ultrasound propagation through human tissues.

Other solution methods exist, such as the small perturbation method, but such methods are generally problem specific. They are therefore of little value as a solution for acoustic wave propagation in a general medium and for arbitrary temporal frequencies.

The acoustic wave equation can also be solved in the time-domain to obtain the time-evolution effects. For problems in an infinite physical domain, this method suffers from difficulties in absorbing boundary conditions. Further, there is the added difficulty of dealing with wave propagation in a high contrast medium. The same problems arise when using the spatial Helmholtz equation.

The Helmholtz equation approach is most suitable for inversion/imaging applications. Full waveform imaging/inversion uses all the time series data at the sensor locations. The difficulty with the high temporal frequency approximation is that not all of the sensed data can be readily utilized.

In short, the state of the art for solving a time-dependent wave equation is both resource taxing and time consuming. Each of the aforementioned methods, i.e. ray tracing, the parabolic wave equation, and the Helmholtz reduced wave equation, has limitations which limit real-world applications for computerized modeling using acoustics.

SUMMARY OF THE INVENTION

The present invention is directed towards a method of generating sample data from a computerized model of a mass using acoustic simulations. First, the computerized model of the mass is provided. Next, the model is divided into a plurality of layers and each layer is characterized by a propagation wavenumber. Acoustic wave equations for the layered model are then solved using a multi-level generalized minimal residual (GMRES) algorithm. A set of acoustic data is then generated using the solved wave equations. The generated data is then stored in a memory for future access.

The solution to the wave equations is preferably achieved by first factoring out of the wavefields for each layer of the model the oscillatory part of both the forward propagation and the backward propagation discrete transverse wavenumber wavefields. This leaves only a discrete set of the slowly varying parts to the wavefields for determination as part of the solution. Since these wavefields are coupled to the solution through a convolution integral, identification of the convolution integral yields the solution. The convolution integral may be obtained by solving a multi-level generalized minimal residual (GMRES) algorithm. Preferably a two-level GMRES algorithm is used, with an outer GMRES using a variable-width three-band subdomain preconditioner, and the inner GMRES using either a layered medium preconditioner or a forward-backward two-equation preconditioner.

Accordingly, an improved method of generating sample data from a computerized model of a mass using acoustic simulations is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
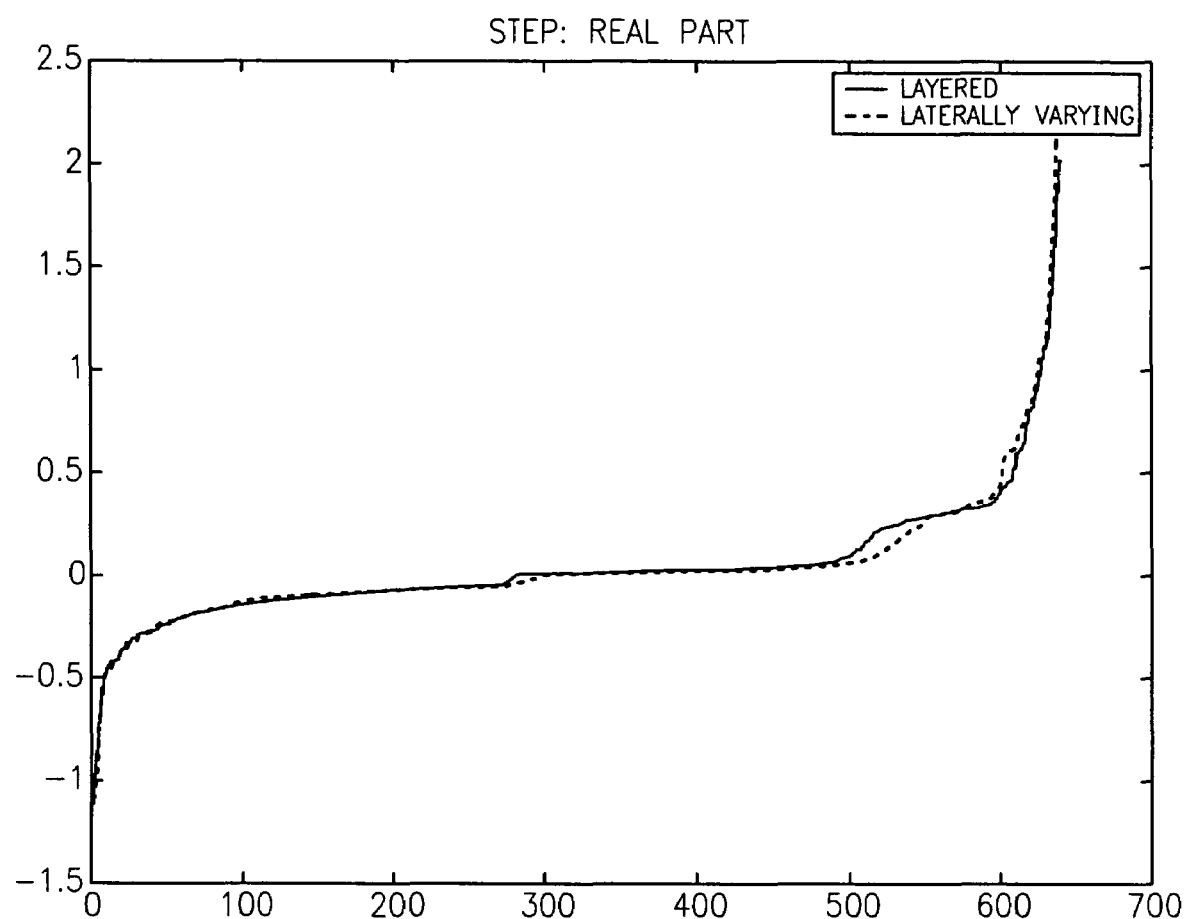
FIGS. 1 & 2 plot a real part and the imaginary parts, respectively, of the eigenvalues of $A_{layer}$ and $A_{layer}+C$ for an exemplar process of solving the acoustic wave equation.

The method of generating sample data discussed in detail below has applications in many fields of endeavor. For purposes of clarity, however, the following description discusses uses within the field of geophysics, wherein the mass is frequently discussed as being strata within the earth in a localized area of subterranean exploration. Such exploration may be for oil, natural gases, water, general scientific research, or for any other purpose.

Many steps of the method of creating a computerized model of physical features within a mass are well known to those skilled in the art. For example, the step of obtaining a first set of sonic data from the mass is well known and understood, as are the steps of creating the initial computerized model, dividing the model into layers, and characterizing each layer by a propagation wavenumber.

The method of generating sample data concerns an efficient numerical algorithm for the approximation of the solution of the acoustic wave equation in three dimensional infinite domain for medium with material properties arbitrary general function of space $x \equiv (x,y,z)$, $$\frac{1}{c^2(x)} \partial_t^2 p(x, t) = \nabla^2 p(x, t) + s(x, t). \tag{1}$$

Most applications of interest have a preferred direction of propagation. For purposes of this discussion, z is taken to be the propagation direction (with positive z being indicative of forward propagation). The wavefield function $\phi(z,k,\omega)$ is introduced as the Fourier transform of p, and is defined by the equation, $$\phi(z,k,\omega) = \int\int dt dr \exp(i[\omega t - k \cdot r]) p(z,r,t). \tag{2}$$

The use of refractive index variation, $\delta n(x)$, is next introduced, $$\delta x = s^2(x)/s_0^2 - 1, \tag{3}$$

where s(x) is the slowness function which is equal to the reciprocal of c(x), and $s_0$ is some reference slowness value—the choice of $s_0$ is important and will become clear. Using the Fourier convolution theorem that the Fourier transform of the product of two function equals to the convolution of their transform, the wave equation Eq. (1) now become the k-z Helmholtz equation, $$\partial_z^2 \phi(z, k, \omega) + (k^2 - k_r^2)\phi(z, \omega) + \frac{k^2}{4\pi^2} \int\int dk' \delta n(z, k - k')\phi(z, k', \omega) = \tilde{s}(z, k, \omega), \tag{4}$$

where k is the wavenumber associated with reference slowness value $s_0$, $$k = \omega s_0, \tag{5}$$

and $\tilde{s}(z,k,\omega)$ is $$\tilde{s}(z, k, \omega) = -\int\int\int dt dr \exp(i[\omega t - k \cdot r]) s(z, r, t). \tag{6}$$

The k-z Helmholtz equation can be further written as a coupled system of two first order (forward propagation and backward propagating) equations, $$\partial_z \phi^f = ik_z \phi^f + \frac{ik^2}{8\pi^2 k_z} \int\int dk' \delta n(z, k - k')\phi(z, k', \omega) + \frac{i\tilde{s}}{2k_z}, \tag{7}$$

$$\partial_z \phi^b = -ik_z \phi^b - \frac{ik^2}{8\pi^2 k_z} \int\int dk' \delta n(z, k - k')\phi(z, k', \omega) - \frac{i\tilde{s}}{2k_z}, \tag{8}$$

where $k_z$ is the vertical wavenumber and is defined by the equation, $$k_z = \sqrt{k^2 - k_r^2}. \tag{9}$$

To resolve the zero vertical wavenumber singularity in Eqs. (7)-(8), the temporal frequency is complexified, $$\omega \Leftarrow \omega + ia. \tag{10}$$

This is somewhat equivalent to the modeling of the physical effects of frequency dependent absorption.

The infinite domain is truncated; the medium is assumed to be homogeneous outside the truncated domain—for practical applications the assumption is valid provided that any variation outside the truncated domain is tens of wavelengths away. The Sommerfeld radiation boundary condition as $|z| \to \infty$ is equivalent to impose that there is no incoming wave from infinity, $$\phi^f(z_a,k,\omega)=0, \tag{11}$$

$$\phi^b(z_b,k,\omega)=0. \tag{12}$$

The discrete transverse wavenumber wavefields are evanescent. Therefore they also go to zero as $|k_\perp| \to \infty$.

For applications in which the present method of generating sample data can be used as part of an inversion/imaging algorithm, the wave equation is solved with an impinging boundary condition at $z=z_a$ and/or at $z=z_b$. That is, the forward wavefield is prescribed at $z=z_a$ and/or the backward wavefield is prescribed.

The slab is divided into layers, $S_j, j=1, \ldots, n_s$. Each layer is characterized by its own wavenumber, $k(S_j)$, $$k(S_j)=\omega_\mu s_0(S_j), \tag{13}$$

where $s_0(S_j)$ is the j-th layer reference slowness and is equal to the root mean square of the slowness function evaluated at mid-layer, $$s_0^2(S_j) = \frac{\int\int\int_{S_j} d\mathbf{r}\, s^2(\mathbf{x})}{\int\int_{S_j} d\mathbf{r}}. \tag{14}$$

Each layer has its dc-removed refractive index variation, $$\delta n(\mathbf{r}, S_j) = \frac{s^2(z_j+1/2, \mathbf{r})}{s_0^2(S_j)} - 1. \tag{15}$$

Figure 2:
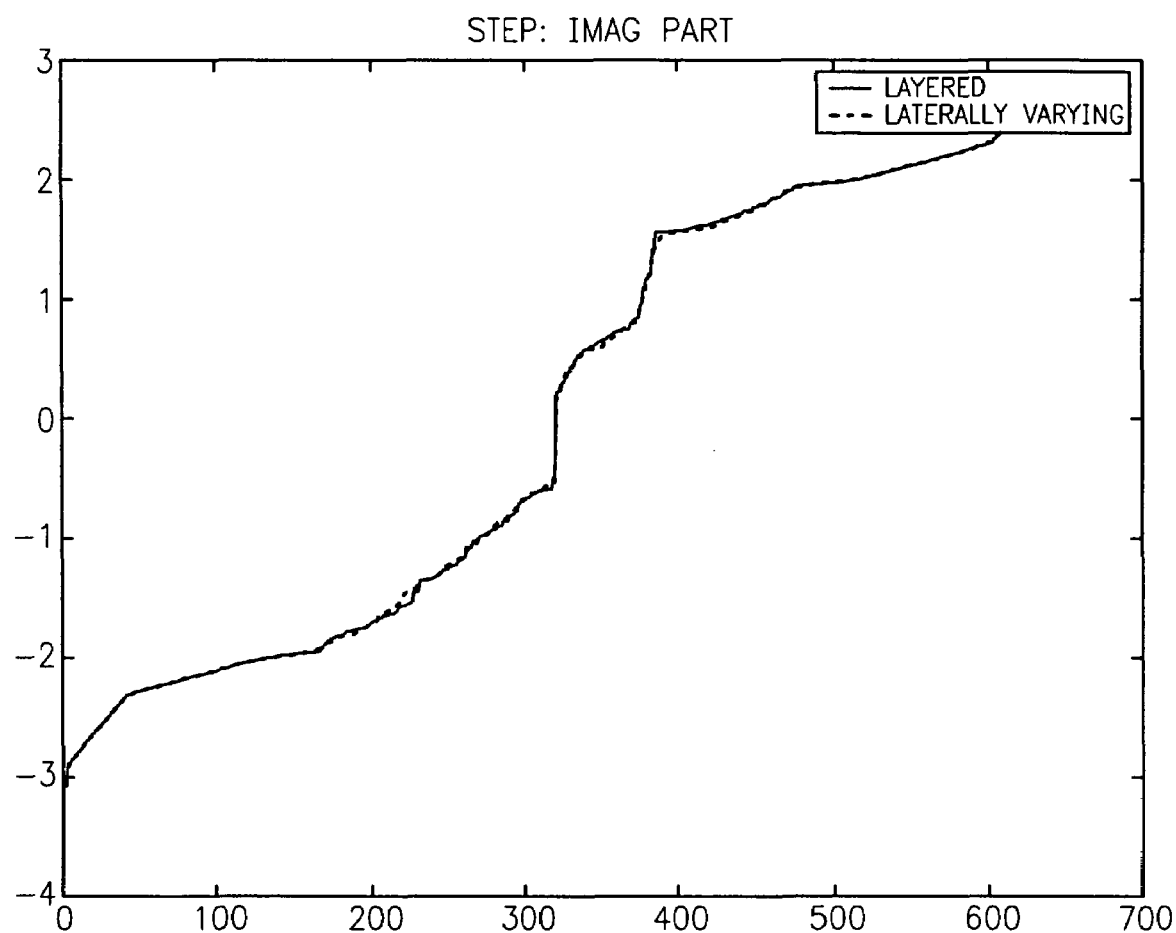

The propagation equations can be written in the matrix form, $$\partial_z \phi = A_{layer}\phi + C\phi + s, \tag{16}$$

where the convolution matrix C is that obtained from the dc-removed refractive index variation, then the eigenvalues of $A_{layer}$ are precisely the vertical wavenumbers corresponding to the layer's reference slowness $s_0(S_j)$ in Eq. (14) regardless of the global slab reference slowness in obtaining the two equation formalism. Indeed, the first order correction of the eigenvalues accounting for the lateral variation term $C_\phi$ is zero. FIGS. 1 & 2 plot the real part and the imaginary part of the eigenvalues of $A_{layer}$ and $A_{layer}+C$.

For each layer, the discrete transverse wavenumber wavefields can be written as the product of an oscillatory part and a slowly varying part (in the propagating direction), $$\phi^f(z,k_\perp,S_j)=\exp(ik_0(k_\perp,S_j)z)\psi^f(z,k_\perp,S_j), \tag{17}$$

$$\phi^b(z,k_\perp,S_j)=\exp(-ik_0(k_\perp,S_j)z)\psi^b(z,k_\perp,S_j), \tag{18}$$

where $k_0(k_\perp,S_j)$ is real and is to be determined below. The discrete transverse wavenumber wavefields of $\phi^f(z,k,\omega,S_j)$ and $\phi^b(z,k,\omega,S_j)$ are said to be propagating when $\omega s_0(S_j) > k_\perp$ and evanescent when $\omega s_0(S_j) < k_\perp$. The factorization in Eqs. (17) & (18) effectively take out the oscillatory part for propagating wavefields if $k_0$ is a good approximation of the imaginary part of the eigenvalues of $(A_{layer}+C)$. That $\psi$ are slowly varying in the propagating region implies very few grid points are required in the propagating direction. The rule of thumb of ten grid points per wavelength can now be reduced to as few as one grid point per wavelength in laterally varying layers. For homogeneous layers, the splitting factorization implies that the propagating (layer) step size is independent of the value of the vertical wavenumber of the discrete transverse wavenumber wavefields. The factorization is not required in the evanescent region and is of little value when the vertical wavenumber (eigenvalues of $A_{layer}+C$) is small in magnitude.

The calculated wavefields are required to be continuous at the layer interface. The splitting factorization wavefield can be written as $$\phi(z,k_\perp,S_j)=P(k_\perp,S_j)W(z,k_0(k_\perp,S_j))\psi(z,k_\perp,S_j), \tag{19}$$

where $P(k_\perp,S_j)$ is the eigenvector matrix satisfying $$A_{layer}P(k_\perp,S_j)=P\Lambda, \tag{20}$$

and W(z,k) is the factorization matrix, $$W(z,k) = \begin{pmatrix} \exp(ikz) & \\ & \exp(-ikz) \end{pmatrix}. \tag{21}$$

The continuity condition for the layer factorization formalism is $$W(z_{j+1},k_\perp,S_j)\psi(z_{j+1},k_\perp,S_j)=P(k_\perp,S_{j+1})W(z_{j+1},k_\perp,S_{j+1})\psi(z_{j+1},k_\perp,S_{j+1}) \tag{22}$$

$P(k_\perp,S_{j+1})$ is obtained with layers $S_j$ and $S_{j+1}$ using the j-th layer reference slowness value. Solving for $\psi(z_{j+1},k_\perp,S_j)$, $$\psi(z_{j+1},k_\perp,S_j)=W^{-1}(z_{j+1},k_\perp,S_j)P(k_\perp,S_{j+1})W(z_{j+1},k_\perp,S_{j+1})\psi(z_{j+1},k_\perp,S_{j+1}). \tag{23}$$

Figure 3:
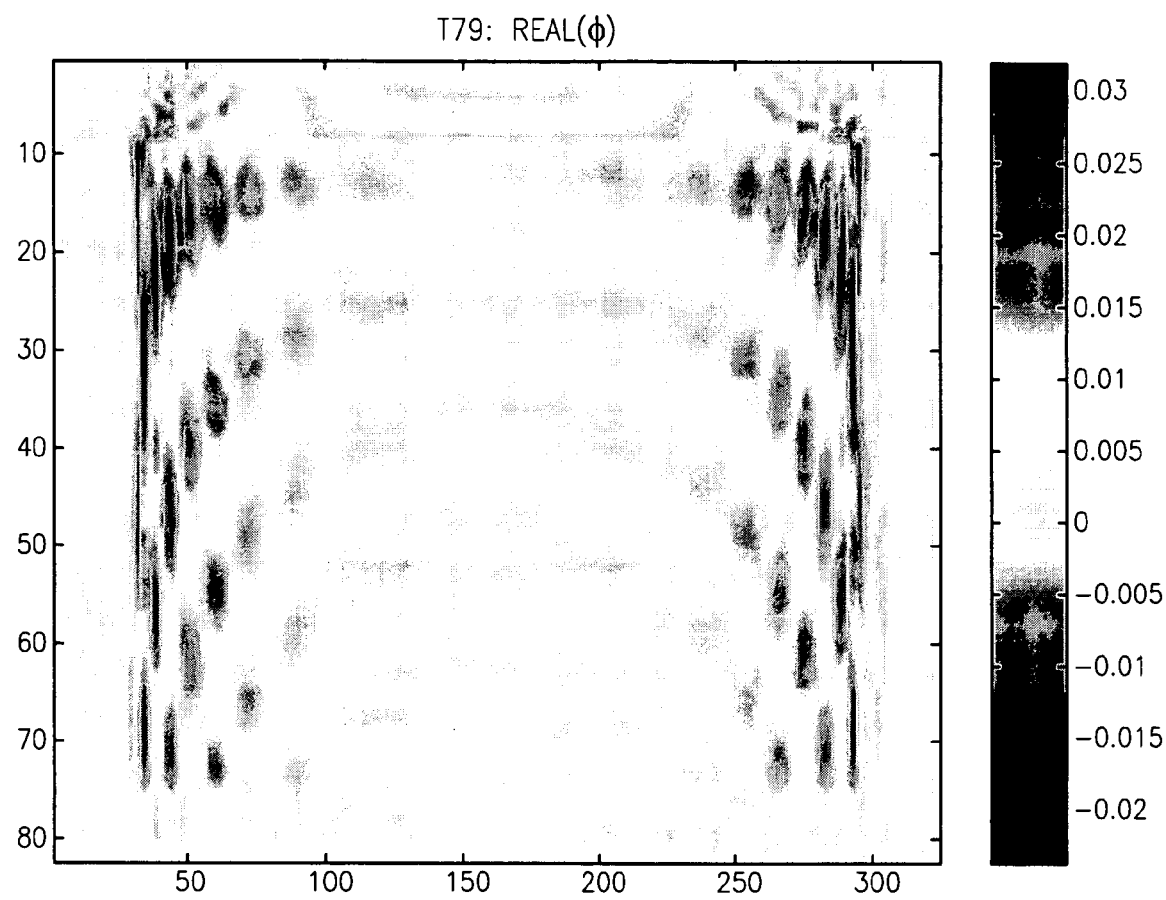
FIGS. 3 & 4 plot the real part and the imaginary parts, respectively, of a total wavefield using a global slab reference slowness formulation.
Figure 4:
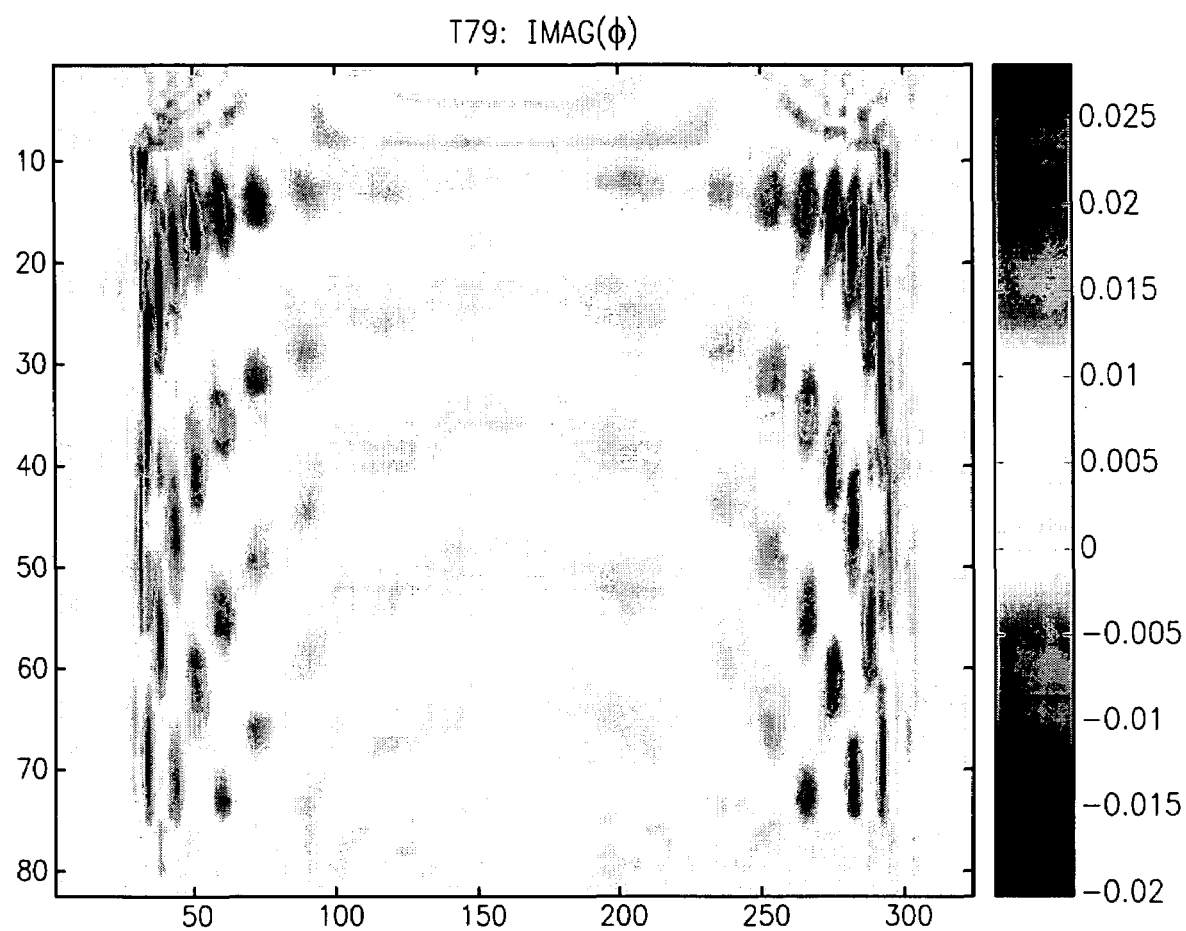
Figure 5:
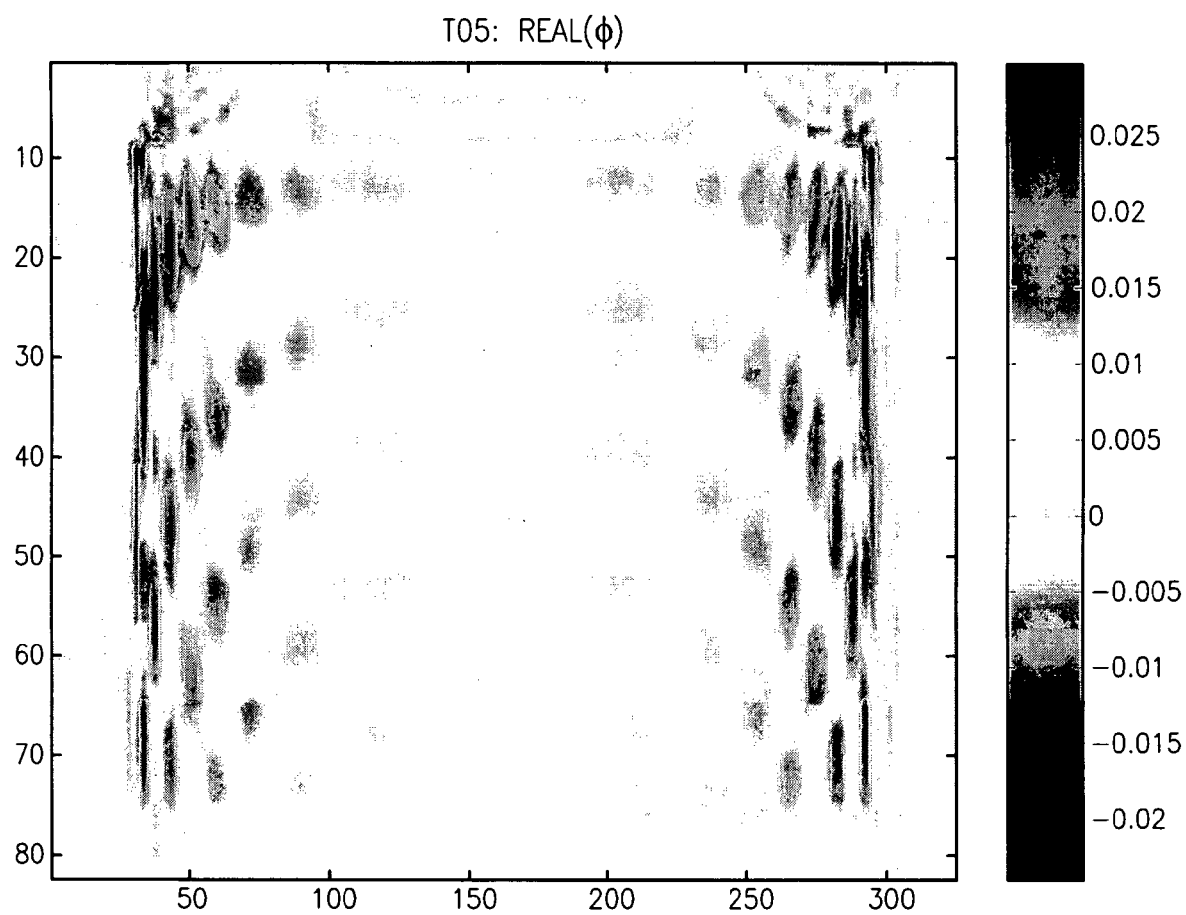
FIGS. 5 & 6 plot the real part and the imaginary parts, respectively, of a total wavefield using a layer splitting factorization formulation.
Figure 6:
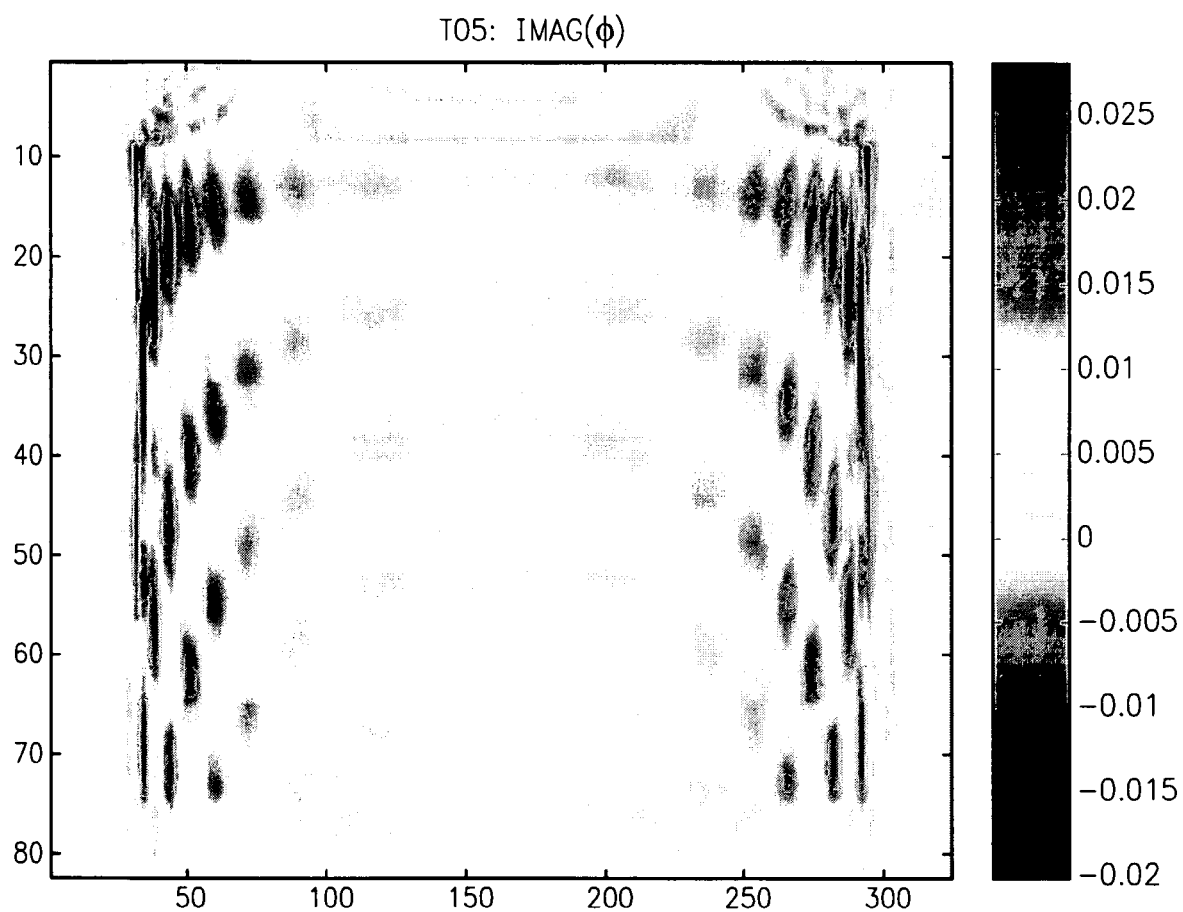

While the solution of the two equation formalism depends on the global slowness and layer reference slowness, the total wavefield which is the sum of $\phi^f$ and $\phi^b$ is unique satisfying the second order Helmholtz reduced wave equation. To illustrate the point, FIGS. 3 & 4 plot the real part and the imaginary part of the total wavefield using the global slab reference slowness formulation and FIGS. 5 & 6 plot the real part and the imaginary part of the total wavefield using the layer splitting factorization formulation.

The layer splitting factorization is used in the two propagation equations. Treating both the convolution terms and the source term, if any, as "forcing" functions, the resulting forward wavefield equation for the slowly varying function $\psi^f$ is integrated from $z_j$ to $z_{j+1}$, and the backward wavefield equation for the slowly varying function $\psi^b$ is integrated from $z_{j+1}$ to $z_j$, the integral difference equations are obtained, $$\psi^f(z_{j+1}, k, S_j) = \psi^f(z_j, k, S_j)\exp(i\delta k_z(k, S_j)\delta z_j) + \quad (24)$$

$$\frac{ik^2(S_j)}{8\pi^2 k_z(S_j)} \int_{x_j}^{x_{j+1}} dz' \exp(i\delta k_z(S_j)[z_{j+1} - z'])\exp(-ik_0(k, S_j)z') \times$$

$$\int dk' \tilde{\delta n}(z, k - k')[\exp(ik_0(k', S_j)z')\psi^f(z, k', S_j) +$$

$$\exp(-ik_0(k', S_j)z')\psi^b(z, k', S_j)] +$$

$$\frac{i}{2k_z(k, S_j)} \int_{x_j}^{x_{j+1}} dz' \exp(i\delta k_z(S_j)[z_{j+1} - z'])$$

$$\exp(-ik_0(k, S_j)z')\tilde{s}(z'),$$

$$\psi^b(z_j, k, S_j) = \psi^f(z_{j+1}, k, S_j)\exp(i\delta k_z(k, S_j)\delta z_j) + \quad (25)$$

$$\frac{ik^2(S_j)}{8\pi^2 k_z(S_j)} \int_{x_j}^{x_{j+1}} dz' \exp(i\delta k_z(S_j)[z' - z_j])\exp(ik_0(k, S_j)z') \times$$

$$\int dk' \tilde{\delta n}(z, k - k')[\exp(ik_0(k', S_j)z')\psi^f(z, k', S_j) +$$

$$\exp(-ik_0(k', S_j)z')\psi^b(z, k', S_j)] +$$

$$\frac{i}{2k_z(k, S_j)} \int_{x_j}^{x_{j+1}} dz' \exp(i\delta k_z(S_j)[z' - z_j])\exp(-ik_0(k, S_j)z')\tilde{s}(z'),$$

The continuity condition in Eq. (23) can be used to substitute $\psi^f(z_{j+1},k_\perp,S_j)$ and $\psi^b(z_{j+1},k_\perp,S_j)$ to obtain the set of integral difference equations for the slowly varying functions $\psi^f(z_j, k_\perp, S_j)$ and $\psi^b(z_j, k_\perp, S_j)$.

Numerical approximations can be made as part of evaluating Eqs. (24) & (25). The first approximation is the evanescent wavefield truncation. When the magnitude of the transverse wavenumber vector is much greater than the magnitude of $\psi s_0(S_{source})$ the corresponding discrete transverse wavenumber wavefield is evanescent and is negligible in magnitude when it is propagated from the source to the layer boundary. Therefore it can be omitted from the set of equations. The error in the evanescent wavefield truncation is negligible.

The second approximation is the numerical treatment of the convolution term in Eqs. (24) & (25). By construction, $\psi$ is slowly varying in z in layer $S_j$. If the refractive index variation is also slowly varying in z in $S_j$, then limited ray optics approximation can be used to approximate both $\psi$ and $\delta n$ within $S_j$ by their mid-layer values, $$\psi(z, k_\perp) \approx \psi(z_j + \frac{1}{2}, k_\perp), z \in S_j, \quad (26)$$

$$\delta n(z, r) \approx \delta n(z_j + \frac{1}{2}, r), z \in S_j. \quad (27)$$

In Eqs. (24) & (25), the exponential factors $\exp(\pm k_0(k_\perp, S_j))$ can be taken outside the integrand using a multiband convolution algorithm described as follows. The integration in $k_\perp$ is divided into bands such that the factorization vertical wavenumber $k_0(k_{195}, S_j)$ is a constant within the bands. The multiband algorithm needs only be done for the propagating transverse wavenumbers. The width of the band is determined by requiring the vertical wavenumber does not deviate from the band's $k_0(k_\perp, S_j)$ by a prescribed value equivalent to say one (or two) points per wavelength. Within the band, the exponential factors $\exp(\pm k_0(k_\perp, S_j))$ can be taken outside the integral resulting the z-integration separable from the transverse wavenumber integration. If the width of the band is not small, discrete Fourier transform (DFT) can used to evaluate the convolution, otherwise the convolution integral is done in the transverse wavenumber domain. The z-integration can be done in closed form using sinc functions.

The multiband convolution allows the use of very few grid points per wavelength along the propagation direction in exchange of a few more convolution evaluation which can be done very efficiently using fast Fourier transform methods. The algorithm is exact.

The limited ray optics approximation in Eqs. (26) & (27) is second order accurate in z. Aside from the use of discrete Fourier transform method in approximating the convolution term—which has geometric accuracy for periodic functions—the limited ray optics approximation is the only approximation used in this new algorithm.

For many applications of interest, the sound speed has jump discontinuities at the interfaces of objects. When interface does not fall on a grid point, care must be taken to correct for the convolution term. The correction must be done in the spatial domain, with the convolution integral written as the Fourier transform of the product of $\delta n$ and the inverse transverse Fourier transform of $\phi$.

Even with the use of the layer splitting factorization algorithm, the dimension of the set of equation matrix for most problems of interest is too large for direct solution approach to be practical. The set of integral difference equations are sparse but it is readily evaluated using fast Fourier transform method. Therefore, iterative methods are appropriate.

For very large temporal frequency solution, the integral difference equation matrix is indefinite, admitting eigenvalues on both sides of the complex plane. This makes conventional stationary iterative methods, such as a multigrid method using Gauss-Seidel as a smoother, difficult to implement for general problems of interest.

The generalized minimum residual method has proven to be very robust for indefinite problems. Indeed, a one level GMRES works very well using a layered medium preconditioner for very simple laterally varying models. However, a single level GMRES is inadequate for more complex models.

For acoustic wave propagation through general complex models, the method of generating sample data described herein proposes the use of a two level GMRES algorithm: the outer GMRES uses a variable-width three-band subdomain lower block triangular preconditioner, and the inner GMRES uses (spatial frequency dependent) either a layered medium preconditioner or a forward-backward two-equation lower block triangular preconditioner.

There are three kinds of wavefields: propagating, evanescent, and transitional with the vertical wavenumber having very small magnitude. The propagating wavefields, characterized by large vertical wavenumber and small backscattering (parabolic approximation) are best described by the two equation and best solved using the forward-backward two-equation lower block triangular preconditioner, the rate of convergence is very fast. The preconditioner equations can best be written in the primitive form, $$\partial_z \phi^f = ik_z \phi^f + \frac{ik^2}{2k_z} \int\int df' \tilde{\delta n}'(f - f')\phi^f(f') + \frac{i\tilde{s}}{2k_z}, \quad (28)$$

$$\partial_z \phi^b = -ik_z \phi^b - \frac{ik^2}{2k_z} \int\int df' \tilde{\delta n}'(f - f')\phi^b(f') - \frac{i\tilde{s}}{2k_z}. \quad (29)$$

The evanescent wavefields, characterized by imaginary vertical wavenumber, decay exponentially and is therefore intuitively insensitive to the lateral variation of the medium. The layered medium preconditioner equations can be obtained by setting the convolution $C\phi$ in Eqs. (24) & (25) to zero. The resulting equation matrix is block tridiagonal, which equation solution can be obtained very effectively. The rate of convergence for the evanescent wavefield integral difference equations, using the layered medium preconditioner, is also very rapid.

Figure 7:
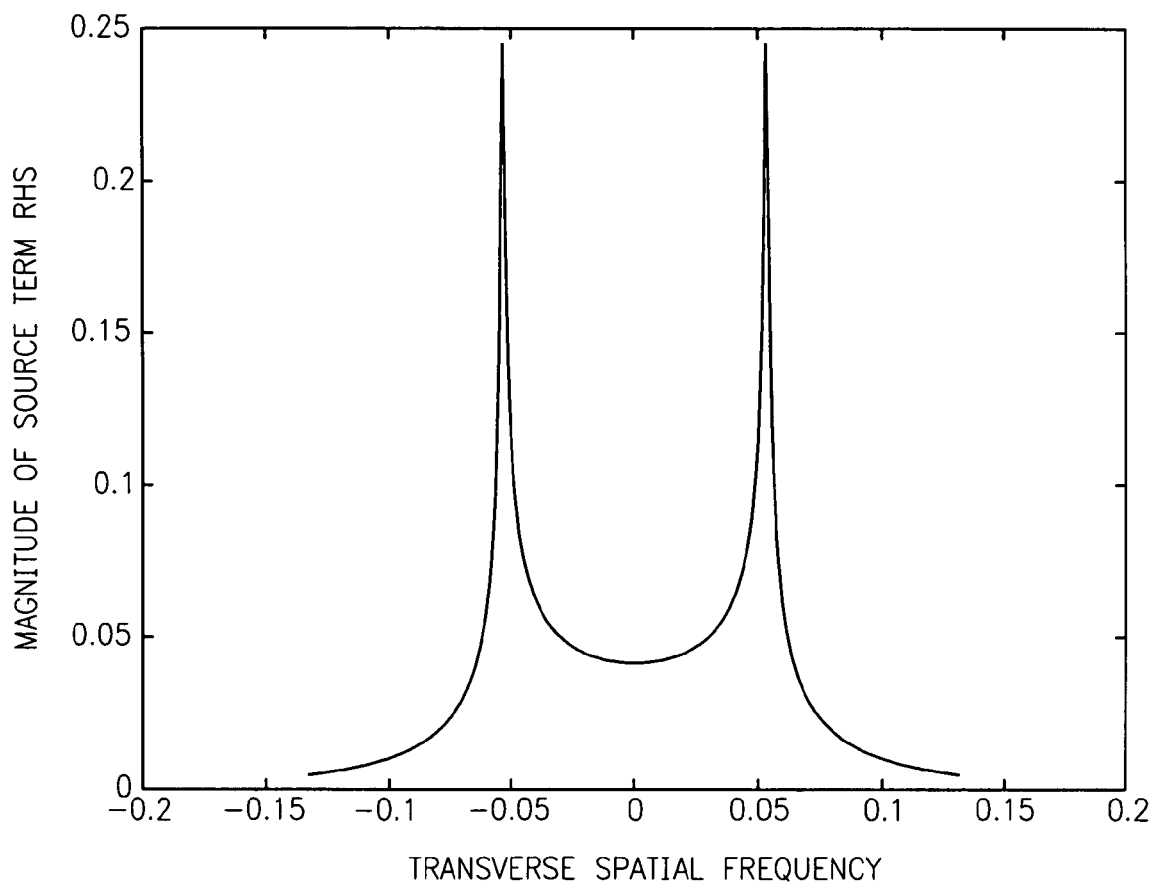
FIG. 7 plots the magnitude of i$\tilde{s}$/2$k_z$ for a Ricker source wavelet at 20 Hz centered frequency.

The transitional wavefields admit both oscillatory (very slowly) and decaying (weakly exponentially) parts. The layered medium preconditioner equation comparatively better approximates the wavefield equations than the forward-backward two-equation lower block triangular preconditioner equations in Eqs. (28) & (29). The rate of convergence is relatively slow compared with the propagating wavefields and the evanescent wavefields. For very complex models, the transitional wavefield equations take almost ninety percent of the CPU. In particular, the source term in the k-z two equation formalism in Eqs. (28) & (29) is weighed by $i/2k_z$. That is, the effects of the source term is largest at transverse wavenumber values at which the vertical wavenumber is small in magnitude. FIG. 7 plots the magnitude of $i\tilde{s}/2k_z$ for a Ricker source wavelet at 20 Hz centered frequency, which is used in the examples below to simulate sample data, although other source wavelets could be used.

In the two level GMRES algorithm, the inner GMRES modules are repeatedly invoked. GMRES calculates a set of orthogonal vectors for the equation matrix, and the matrix does not change. Therefore, the set of orthogonal vectors created the first time the algorithm is called can be used for all subsequent calls. This multiple right hand side GMRES algorithm, when it is necessary to use in the propagation of very complex models, proves to be very efficient.

The set of integral difference equations for the discrete transverse wavenumber wavefields in the generic form, $$\begin{pmatrix} a_{11} & a_{12} & a_{13} \\ a_{21} & a_{22} & a_{23} \\ a_{31} & a_{32} & a_{33} \end{pmatrix} \begin{pmatrix} x_t \\ x_p \\ x_e \end{pmatrix} = \begin{pmatrix} f_t \\ f_p \\ f_e \end{pmatrix}, \quad (30)$$

where $a_{ij}$ are block matrices and subscript t, p, e denotes transitional wavenumber wavefields, propagating wavenumber wavefields, and evanescent wavenumber wavefields respectively. A block lower triangular subdomain iterations preconditioner matrix p to Eq. (30) is $$P = \begin{pmatrix} a_{11} & & \\ a_{21} & a_{22} & \\ a_{31} & a_{32} & a_{33} \end{pmatrix}. \quad (31)$$

The off-diagonal contributions are convolution integral terms. For example, $$a_{21}x_t = \frac{ik^2}{2k_z} \int\int df' \tilde{\delta n}'(f-f')\phi_t(f'). \quad (32)$$

This completes our discussion on the iterative solution algorithm for the integral difference equations. In summary, the constructed algorithm is unconditionally stable and is second order accurate in the propagation step size $\delta z$. The algorithm discussed herein has the property that the rate of convergence of the iterative algorithm is only weakly dependent on the temporal frequency values and on the number of propagating layers.

Figure 8:
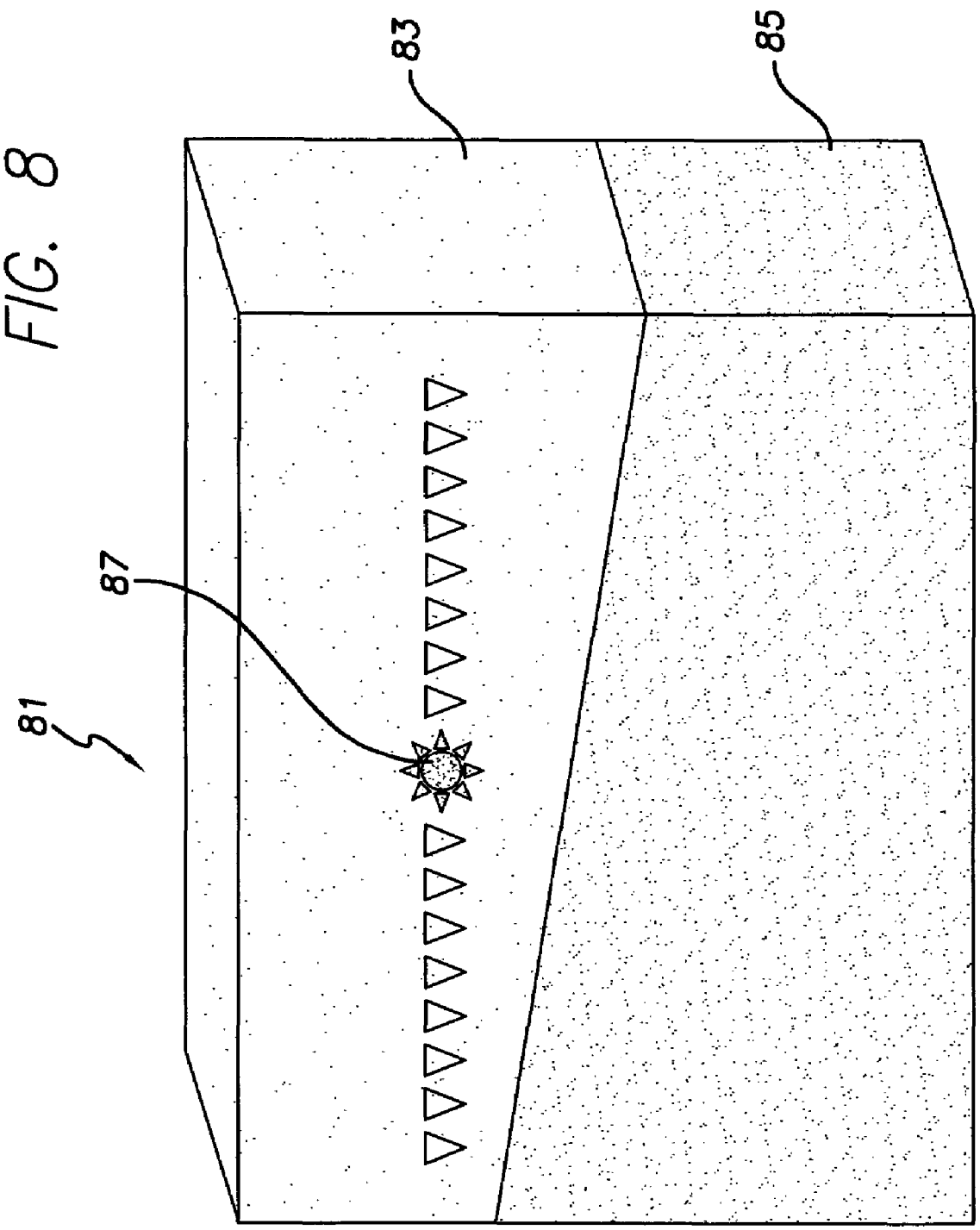
FIG. 8 illustrates a simple geophysics model having a dipping layer.
Figure 13:
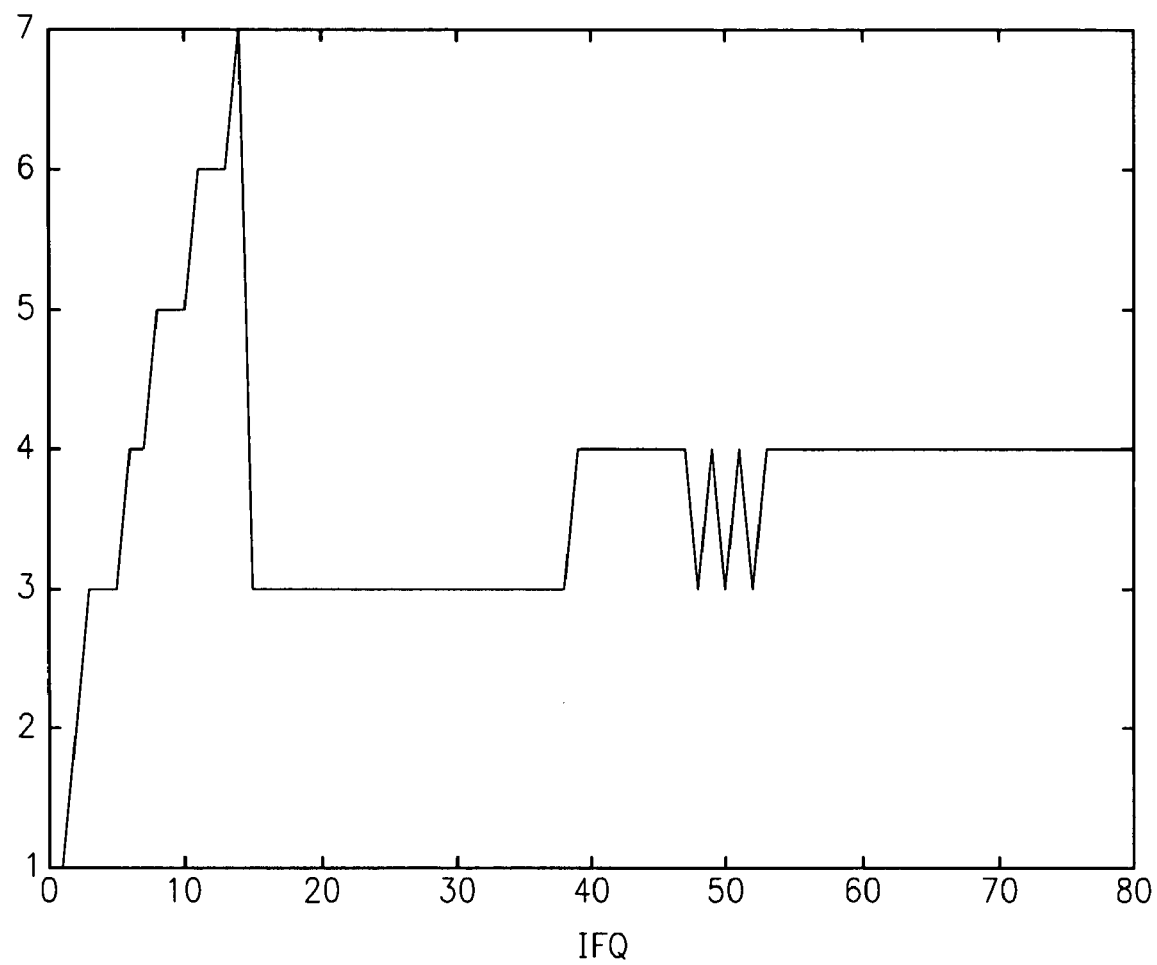
FIG. 13 graphically illustrates convergence for inner GMRES iterations for the model of FIG. 8.

Examples in geophysics and ultrasonic applications are given to illustrate the developed algorithm and to validate the numerical algorithm. These four examples in geophysics are taken from a workshop held by the Society of Exploration Geophysics (SEG). FIG. 8 illustrates a first simple model 81 having a top layer 83 which dips into the bottom layer 87, with the acoustic source 89 being in the indicated location relative to the model and having the forward propagation direction indicated by the arrows. For testing this model, and each subsequent model discussed below, a Ricker wavelet centered frequency of 20 Hz is used, and the sound speed parameters are set at 2300 ms$^{-1}$ for the top layer 83 and 3000 ms$^{-1}$ bottom layer 87. Further, In all calculations, the insonification centered frequency is 4.43 MHz. FIG. 13 plots the number of outer GMRES iterations required for convergence to within a tolerance of 10$^{-6}$ for the dipping layer model of FIG. 8. This indicates that temporal frequency has only weak effects on the rate of convergence.

Figure 9:
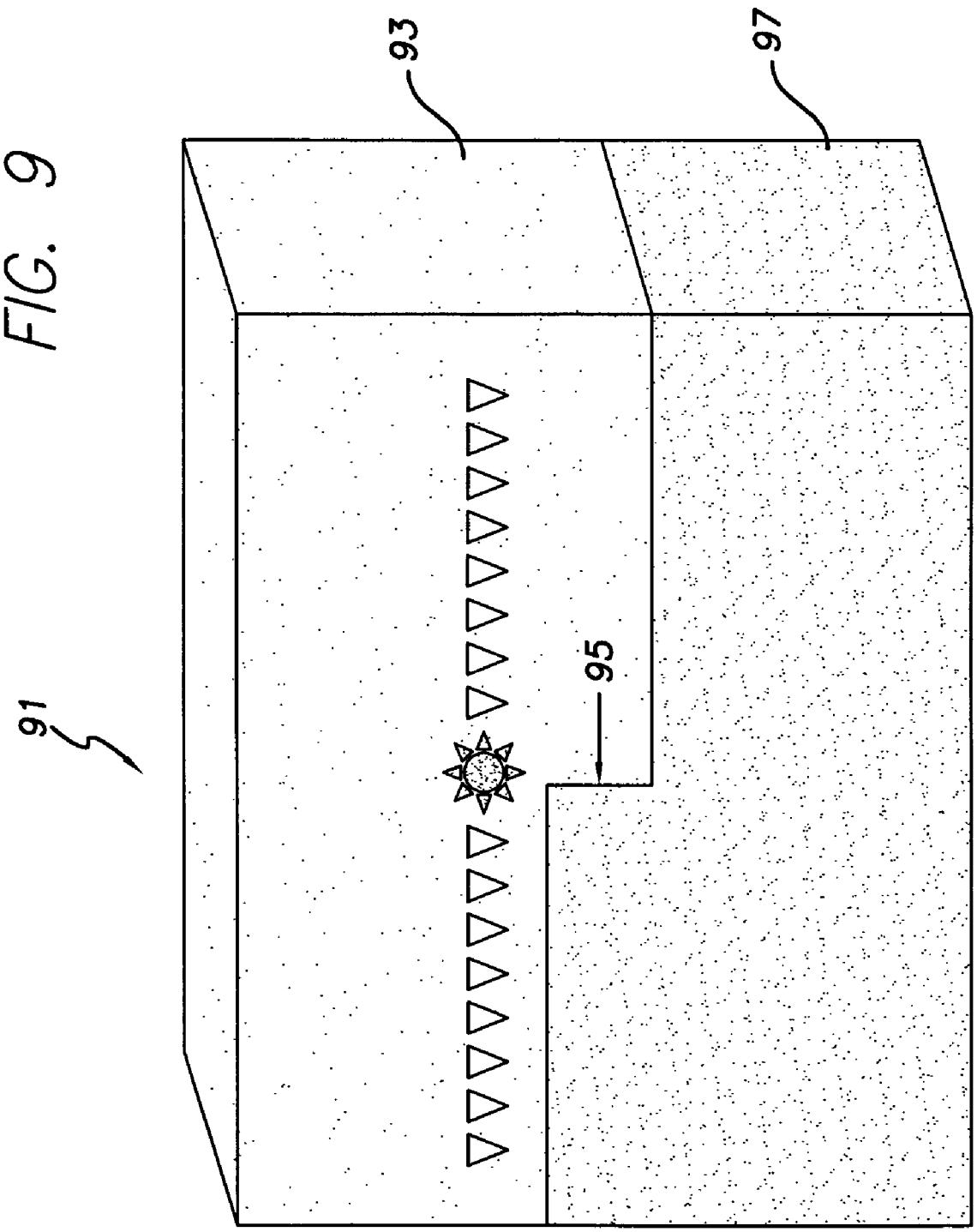
FIG. 9 illustrates another simple geophysics model having a step discontinuity.
Figure 14:
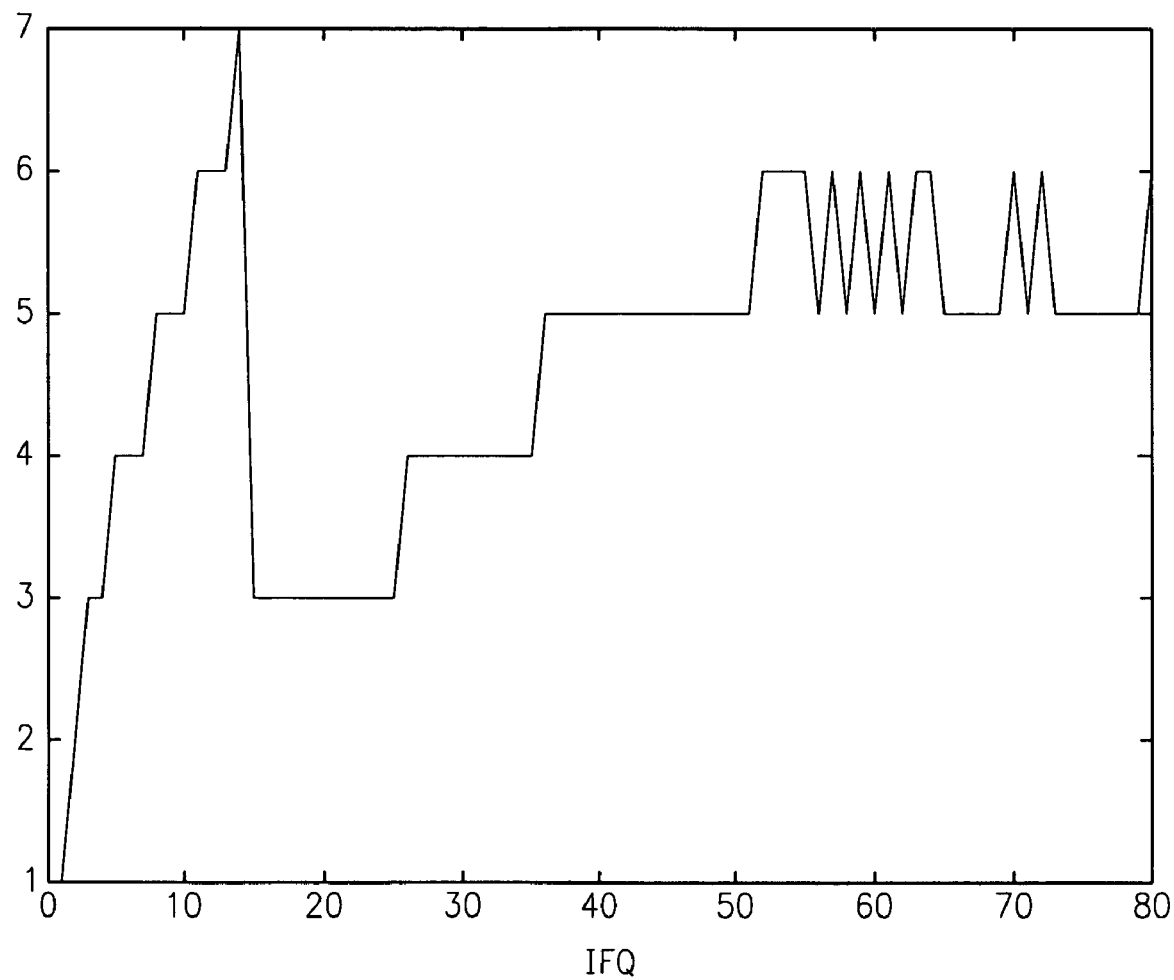
FIG. 14 graphically illustrates convergence for inner GMRES iterations for the model of FIG. 9.

FIG. 9 illustrates a second simple model 91 having a top layer 93 which forms a step structure 95 with the bottom layer 97. The same wavelet and speed of sound parameters are used for testing this model. FIG. 14 plots the number of outer GMRES iterations required for convergence to within a tolerance of 10$^{-6}$ for the step model 91 of FIG. 9. This again indicates that temporal frequency has only weak effects on the rate of convergence.

Figure 10:
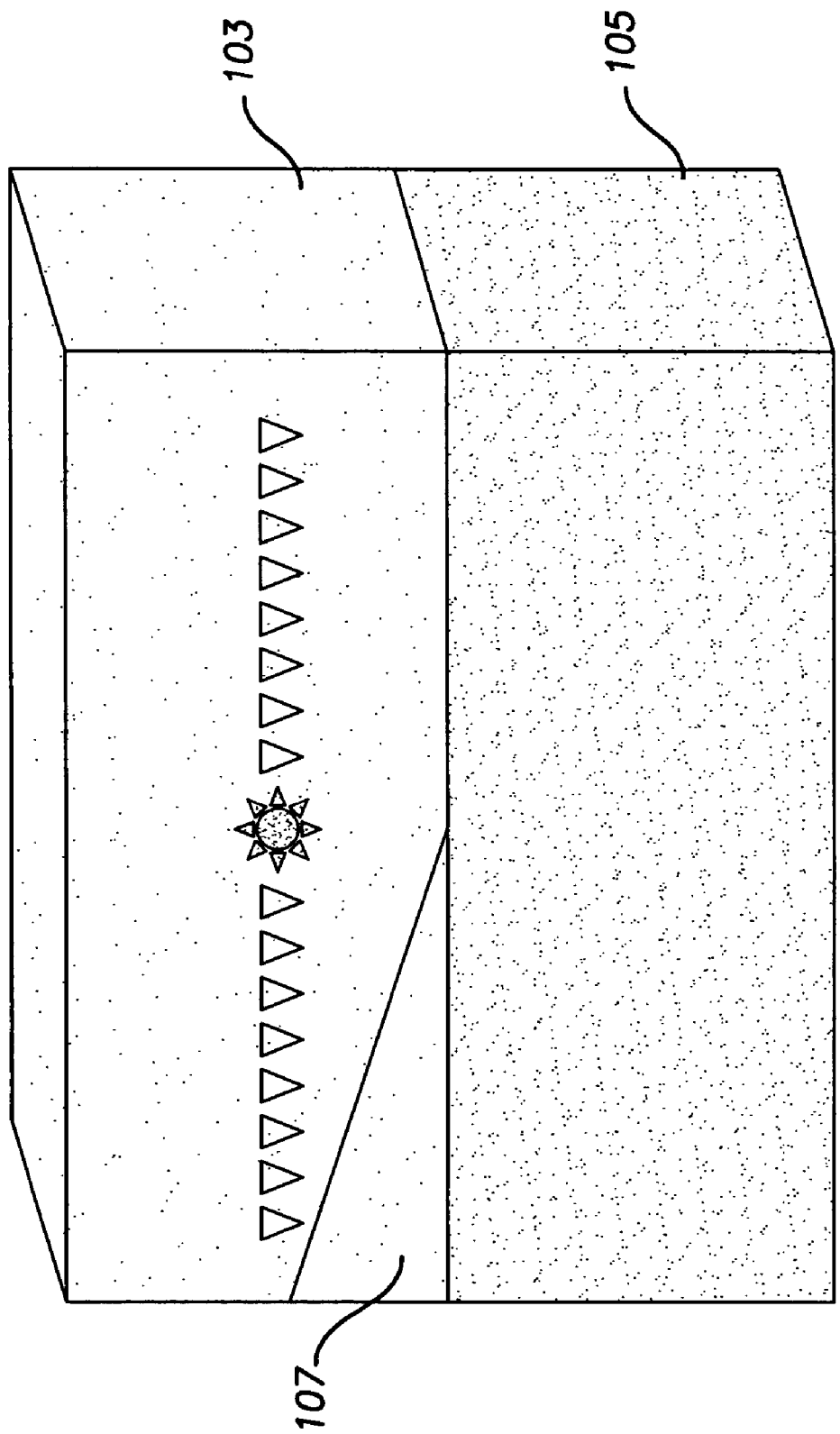
FIG. 10 illustrates yet another simple geophysics model having a wedge discontinuity.
Figure 15:
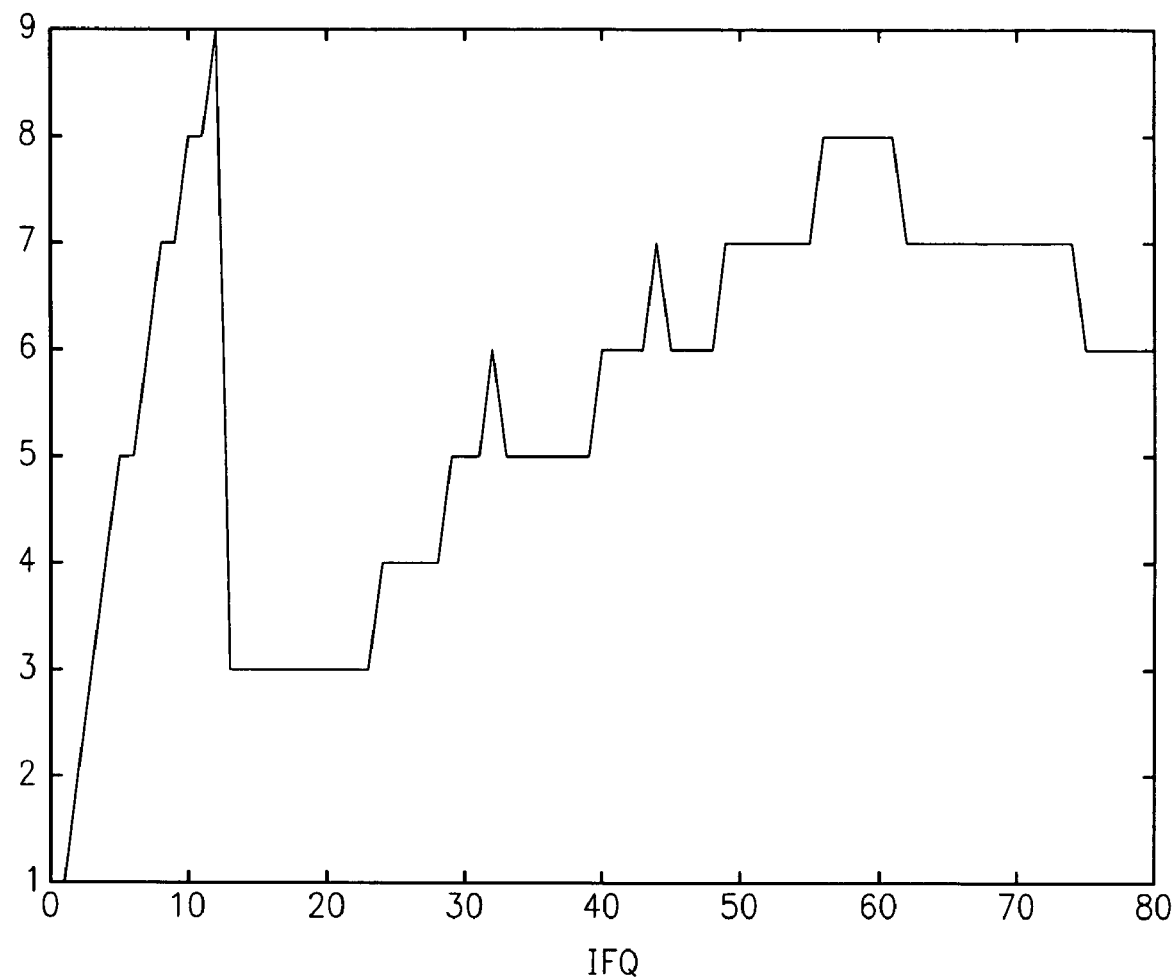
FIG. 15 graphically illustrates a first convergence for inner GMRES iterations for the model of FIG. 10.
Figure 16:
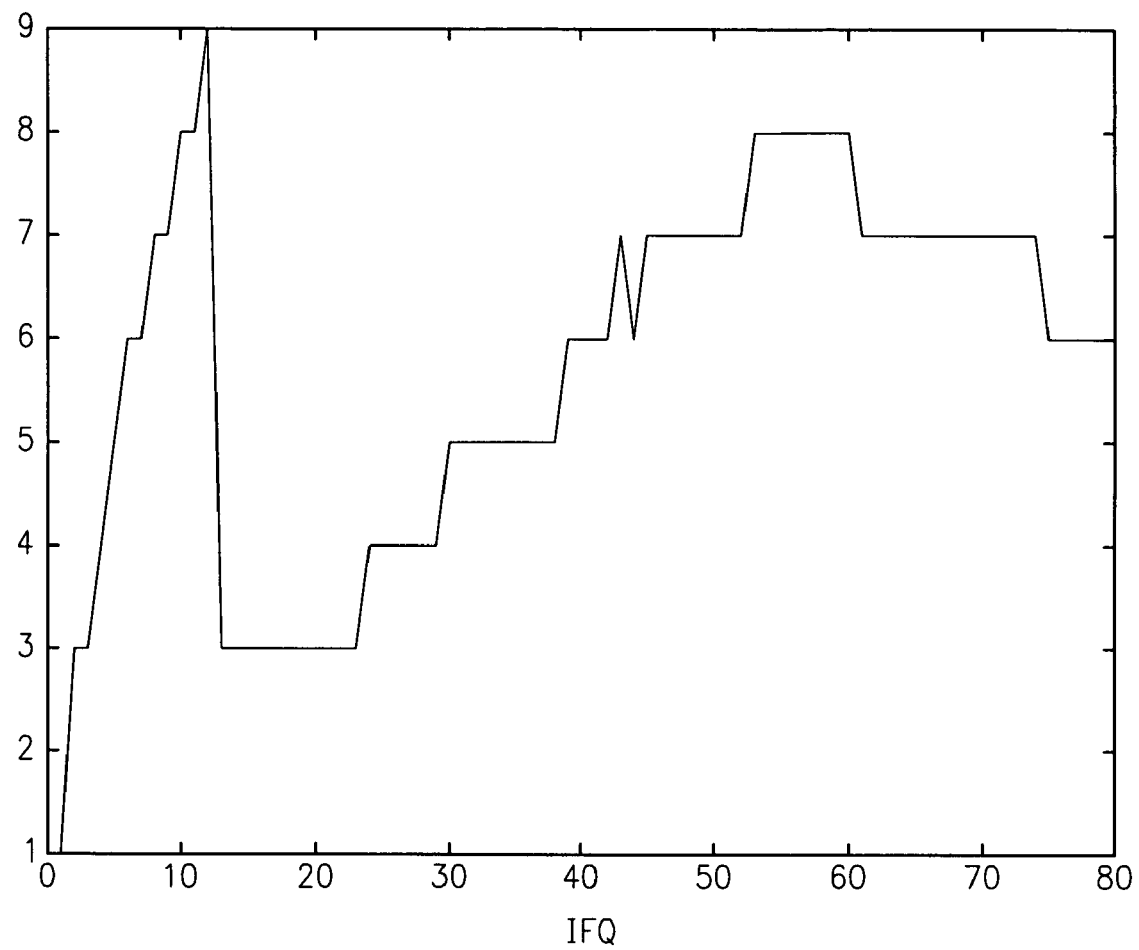
FIG. 16 graphically illustrates a second convergence for inner GMRES iterations for the model of FIG. 10.

FIG. 10 illustrates a third simple model 101 in which the top layer 103 and the bottom layer 105 are partially divided by a wedge layer 107. The same wavelet parameters are used for testing this model. The speed of sound parameters used for testing this model are set at 2300 ms$^{-1}$ for the top layer 103, 3000 ms$^{-1}$ bottom layer 105, and 2600 ms$^{-1}$ for the wedge layer. Testing of this model again shows that temporal frequency has only weak effects on the rate of convergence. Further, this model is used to illustrate that the number of layers have very weak effects on the rate of convergence. FIG. 15 shows the number of outer iterations required for convergence for 3 sub-layers within the wedge layer 107. In comparison, FIG. 16 shows the number of outer iterations required for convergence for 20 sub-layers within the wedge layer 107. The similarities of these plots shows that the number of layers has little effect on the convergence rate.

Figure 11:
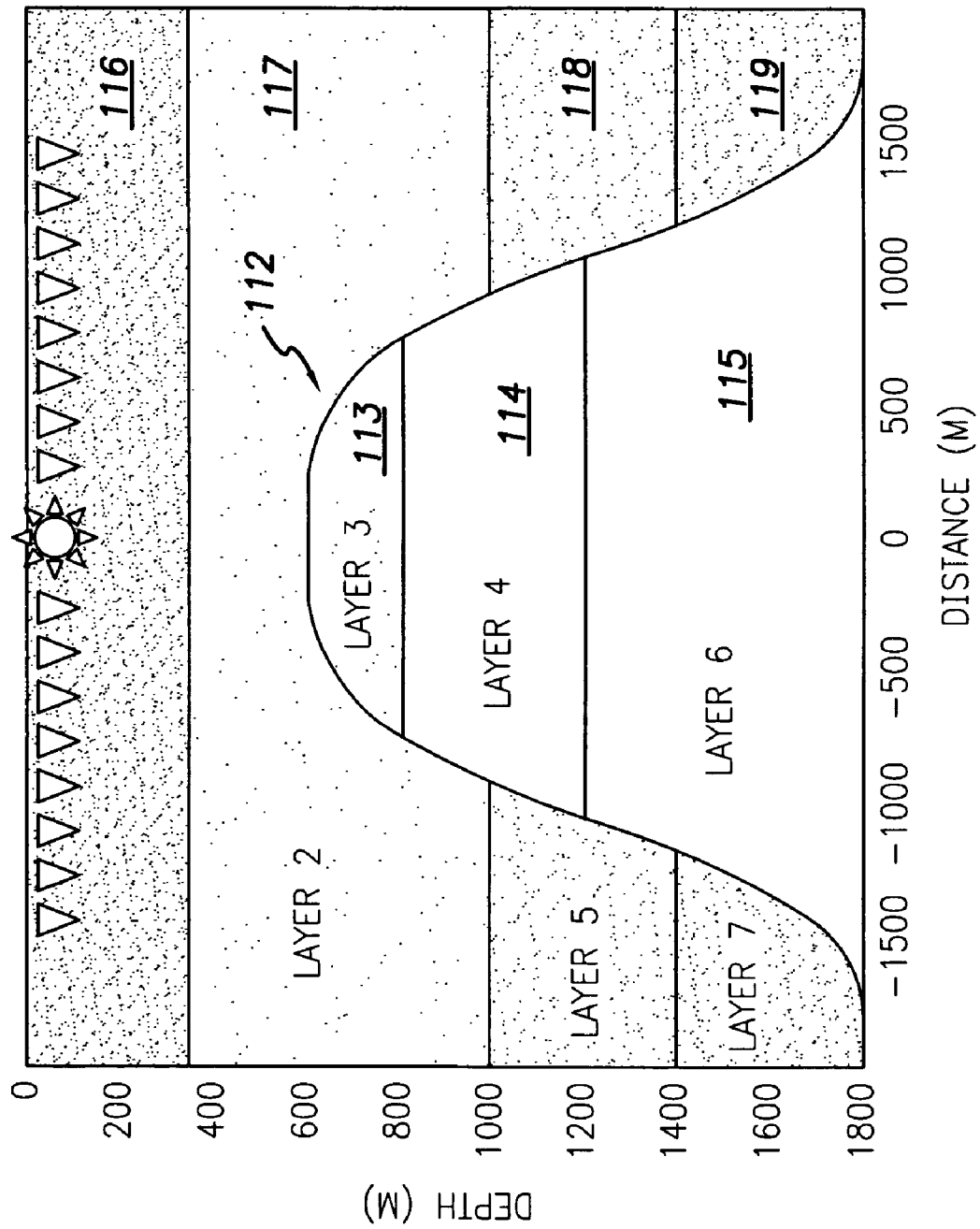
FIG. 11 illustrates a complex geophysics model having a dome formation.

A more complex model 111 is shown in FIG. 11. This complex model 111 includes an internal dome structure 112 formed of several different layers 113, 114, 115. The dome structure 112 is surrounded by several other, differing layers 116, 117, 118, 119. Testing of this model, while the results are not presented here, shows that convergence outer GMRES iterations is largely independent of temporal frequency and the number of layers.

Figure 18:
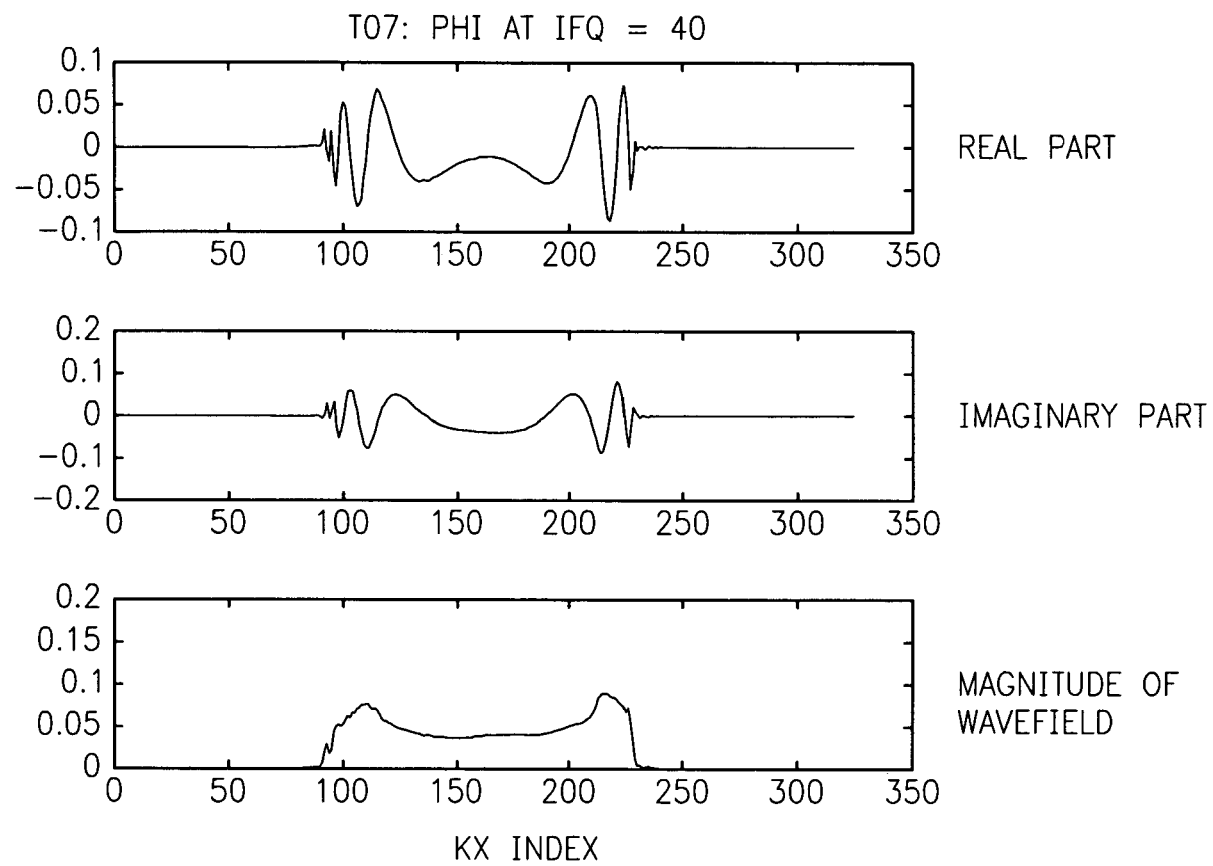
FIG. 18 graphically illustrates the magnitude of the total wavefield in a portion of the model of FIG. 10 using 20 Hz as the temporal frequency value and the propagation step size of the sub-layers equal to $\lambda/2$.
Figure 19:
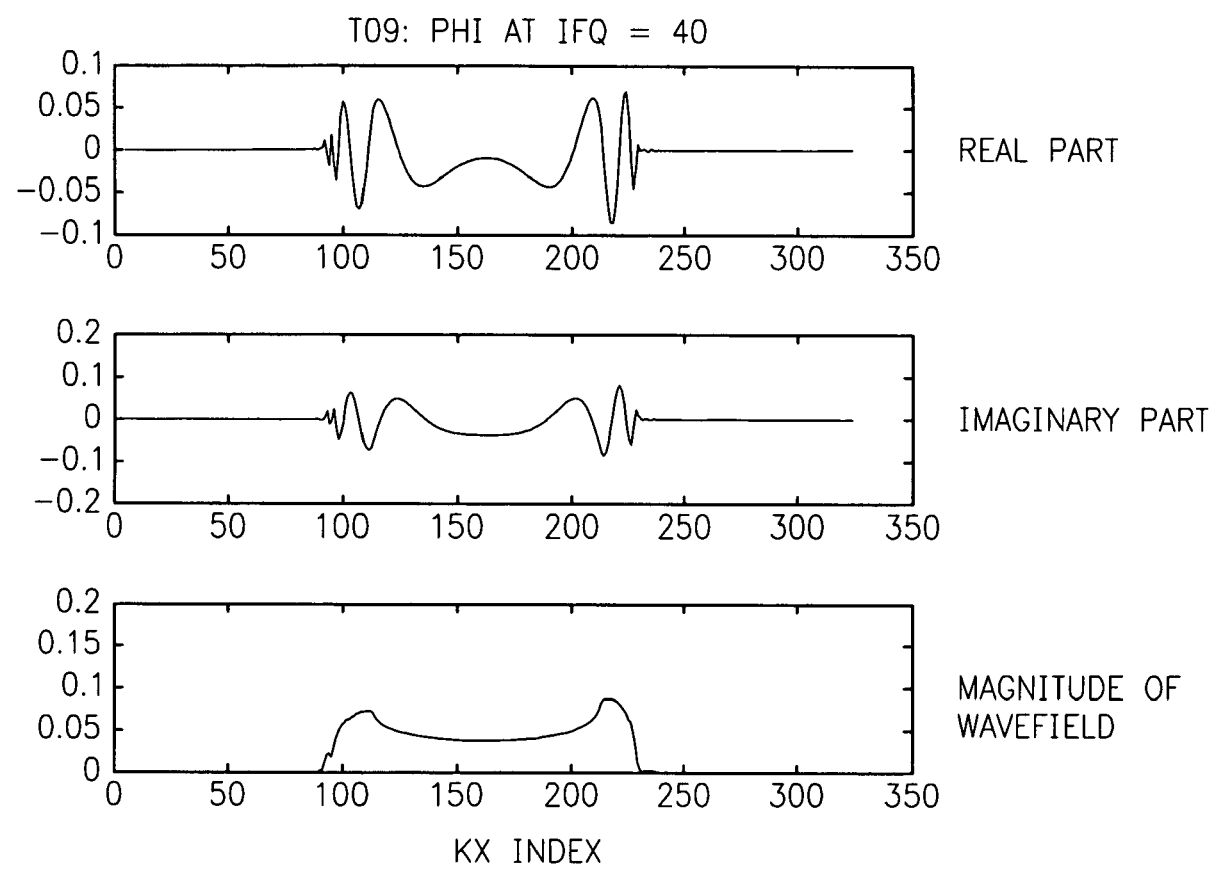
FIG. 19 graphically illustrates the magnitude of the total wavefield in a portion of the model of FIG. 10 using 20 Hz as the temporal frequency value and the propagation step size of the sub-layers equal to $\lambda/8$.
Figure 20:
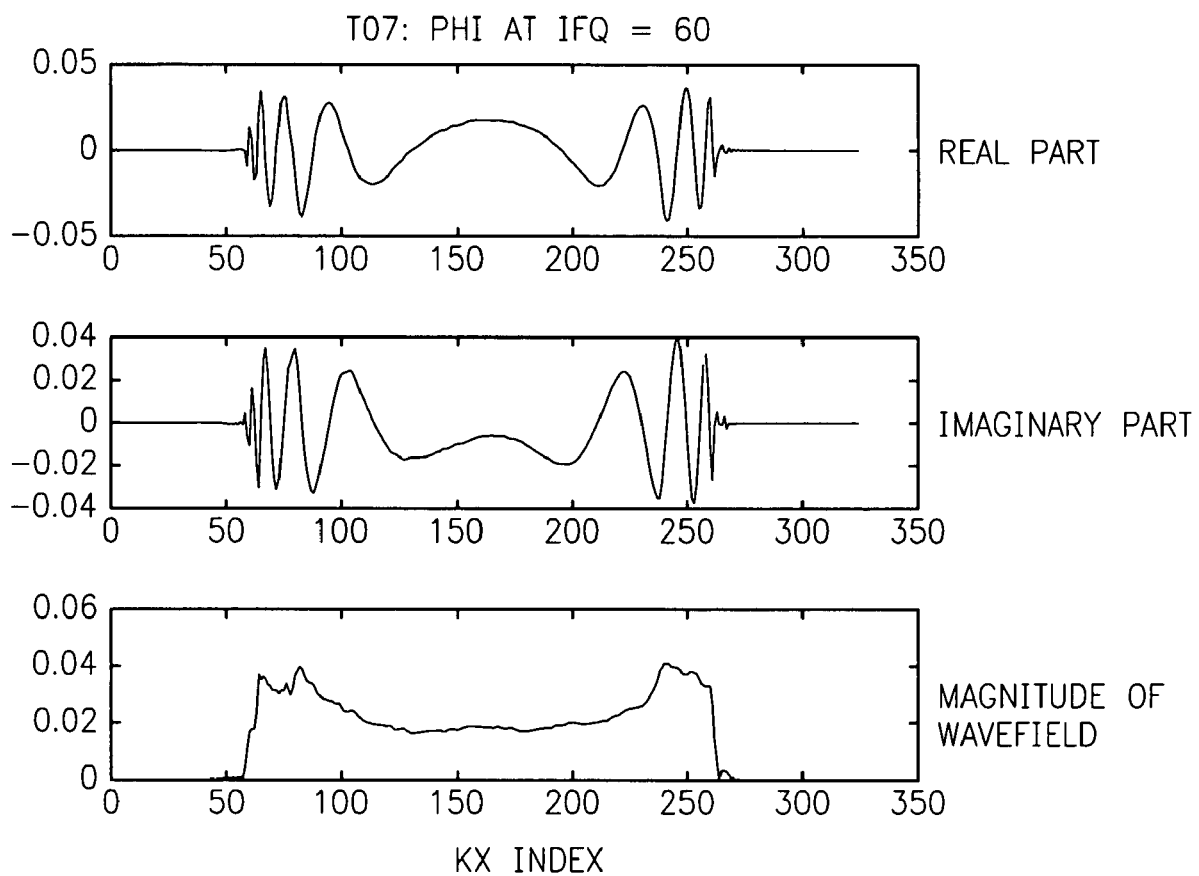
FIG. 20 graphically illustrates the magnitude of the total wavefield in a portion of the model of FIG. 10 using 40 Hz as the temporal frequency value and the propagation step size of the sub-layers equal to $\lambda/2$.
Figure 21:
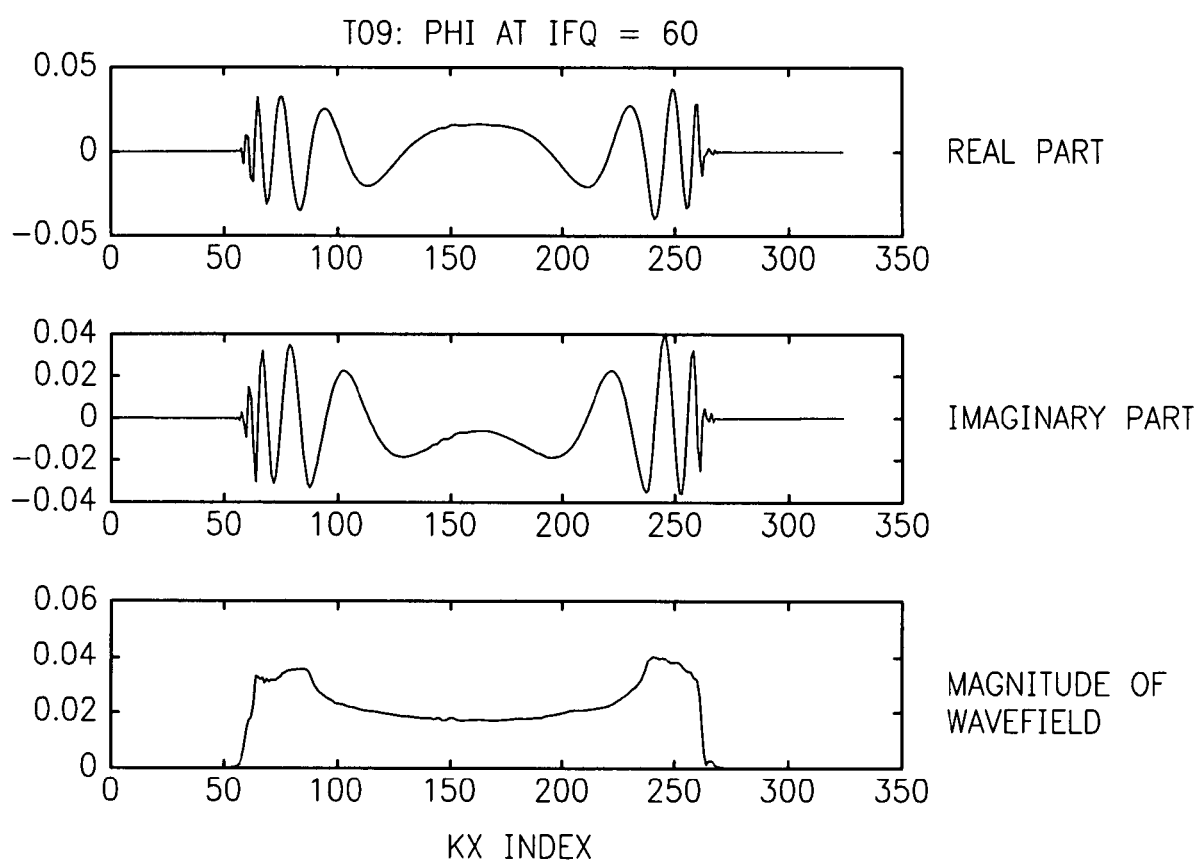
FIG. 21 graphically illustrates the magnitude of the total wavefield in a portion of the model of FIG. 10 using 40 Hz as the temporal frequency value and the propagation step size of the sub-layers equal to $\lambda/8$.
Figure 22:
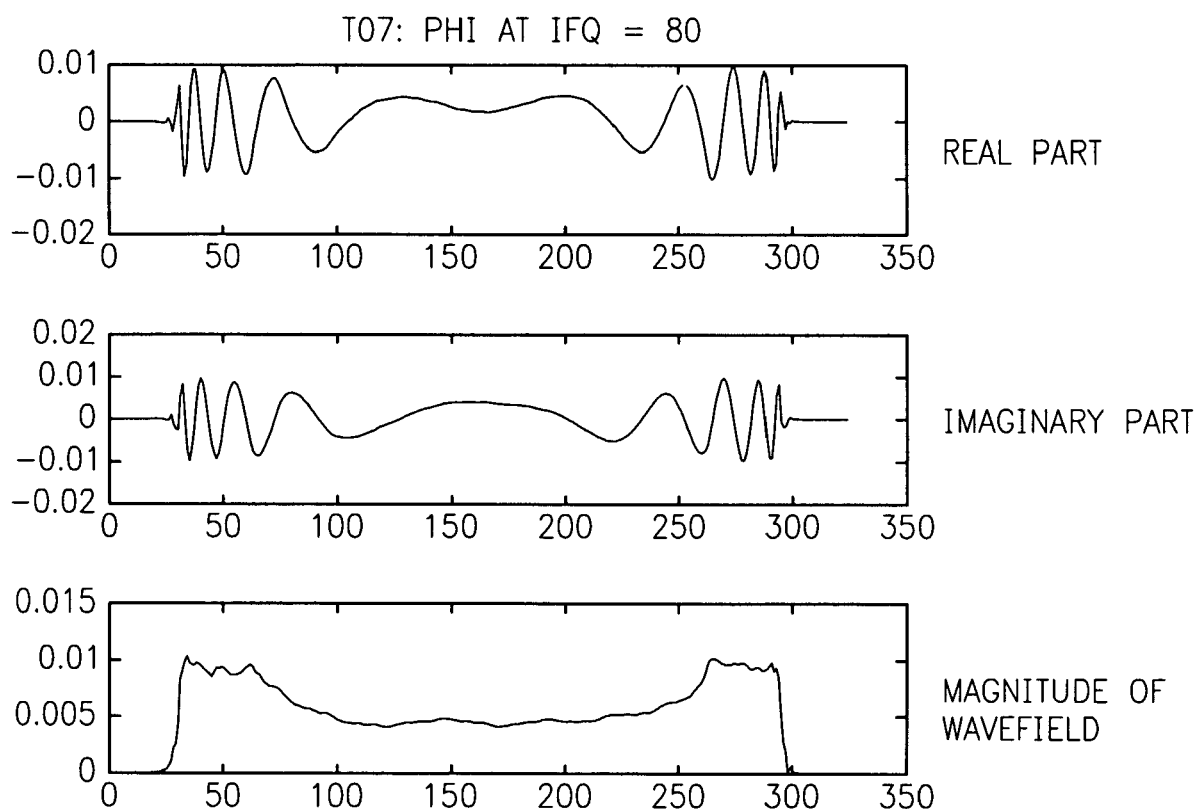
FIG. 22 graphically illustrates the magnitude of the total wavefield in a portion of the model of FIG. 10 using 60 Hz as the temporal frequency value and the propagation step size of the sub-layers equal to $\lambda/2$.
Figure 23:
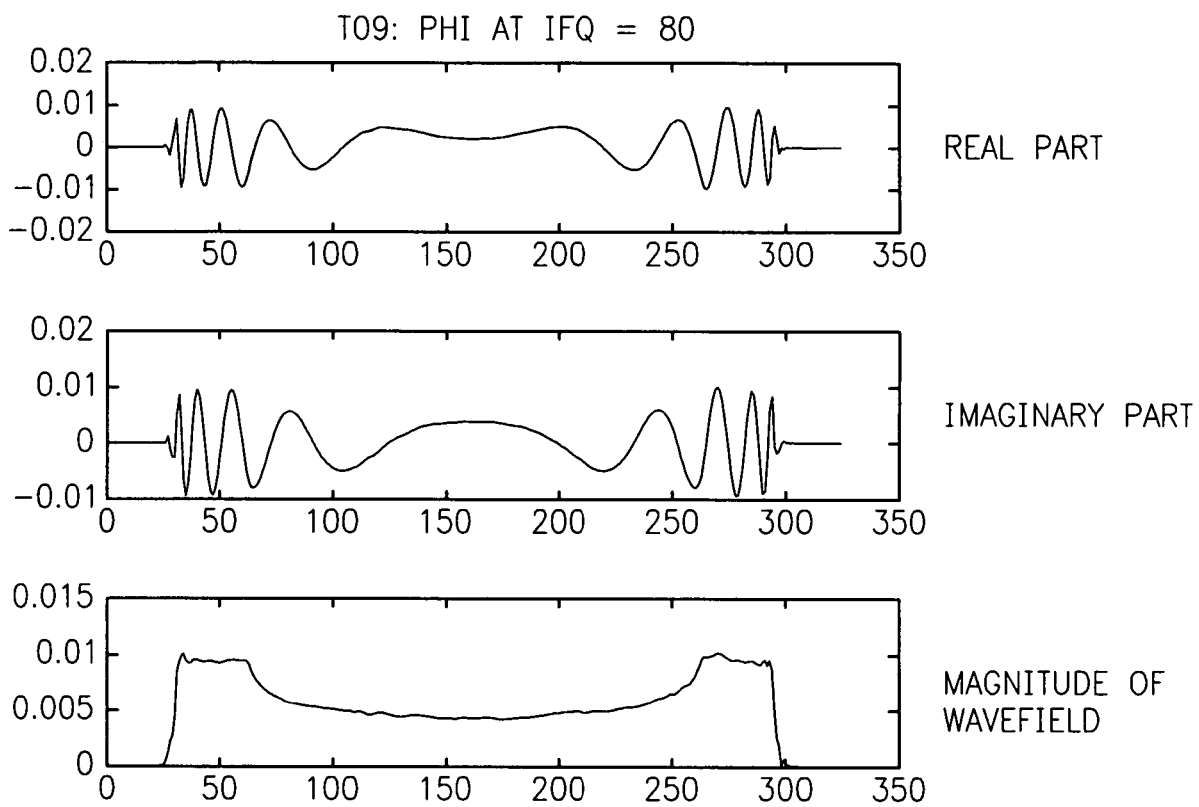
FIG. 23 graphically illustrates the magnitude of the total wavefield in a portion of the model of FIG. 10 using 60 Hz as the temporal frequency value and the propagation step size of the sub-layers equal to $\lambda/8$.

As indicated, relatively few layers are required to obtain an accurate solution. The use of wave splitting factorization allows the propagation stepsize to be solely dependent on the configuration of the model and not on the wavelength associated with the temporal frequency value. Comparison of FIGS. 18 & 19 is illustrative. FIG. 18 shows the real part, the imaginary part, and the magnitude of the total wavefield at the bottom of the wedge layer 107 for the model 101 shown in FIG. 10 for a temporal frequency value of 20 Hz and where the propagation step size of the sub-layers is set to $\lambda/2$. FIG. 19 similarly shows the real part, the imaginary part, and the magnitude of the total wavefield at the bottom of the wedge layer 107 for the model 101 shown in FIG. 10 for a temporal frequency value of 20 Hz. However, in FIG. 19, the propagation step size of the sub-layers is set to $\lambda/8$. FIGS. 20 & 21 show a similar comparison for a temporal frequency value of 40 Hz, where in FIG. 20 the propagation step size of the sub-layers is set to $\lambda/2$, and in FIG. 21 the propagation step size of the sub-layers is set to $\lambda/8$. FIGS. 22 & 23 show a similar comparison for a temporal frequency value of 60 Hz, where in FIG. 22 the propagation step size of the sub-layers is set to $\lambda/2$, and in FIG. 23 the propagation step size of the sub-layers is set to $\lambda/8$.

Figure 12:
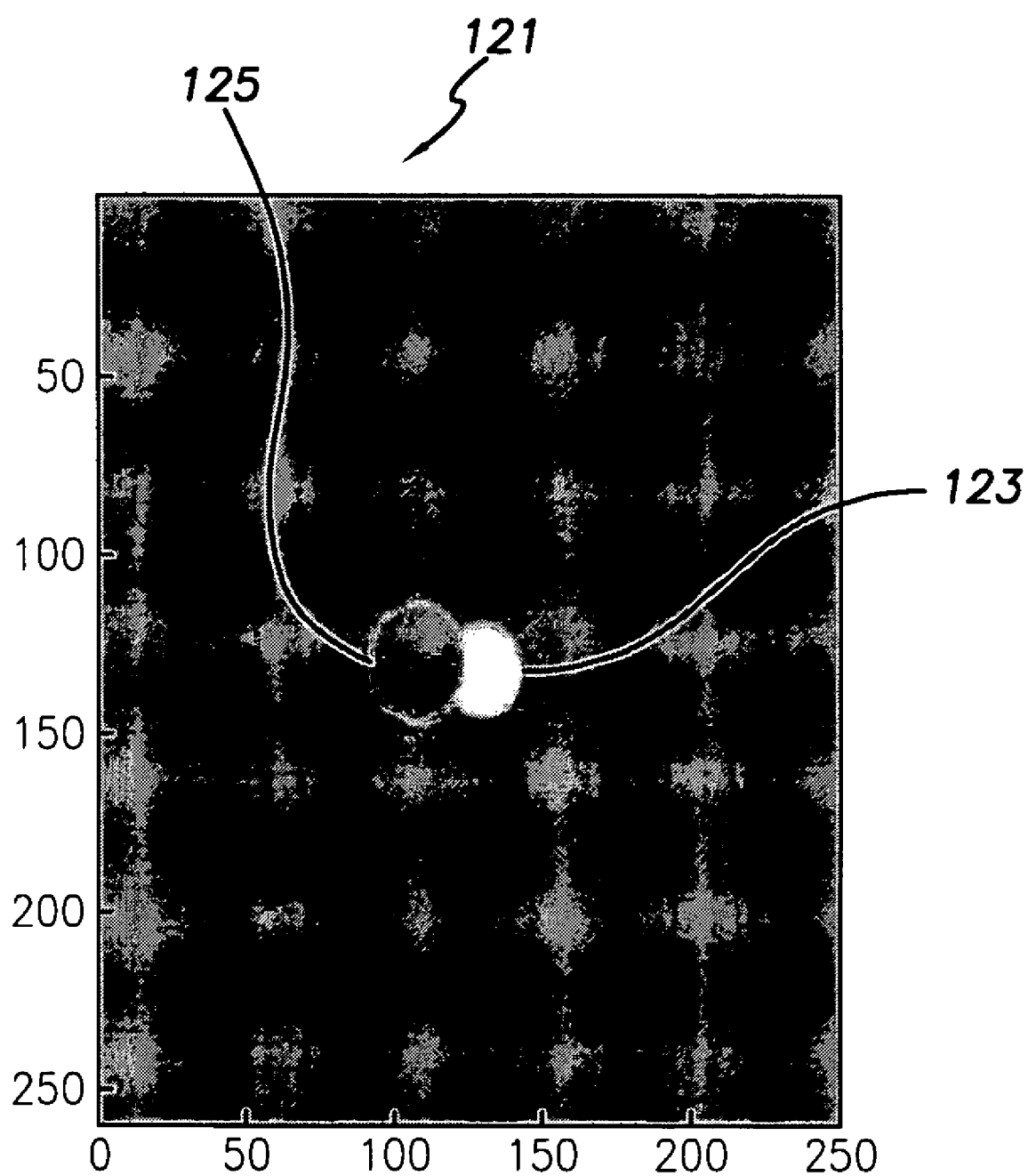
FIG. 12 illustrates an overlapping circle model.

A fifth model 121 is shown in FIG. 12. This model 121 was created for use in ultrasonic applications. It includes a pair of overlapping circles 123, 125 and is used to simulate ultrasonic wave propagation in tissues. For the ultrasonic medical parameters, the sound speed of the overlapping circles correspond to the sound speed of human fat, blood, muscles, and lungs; the background sound speed is that which corresponds to bodily fluid. The sound speed of the infinite cylinder corresponds to the sound speed of human muscle.

Figure 17:
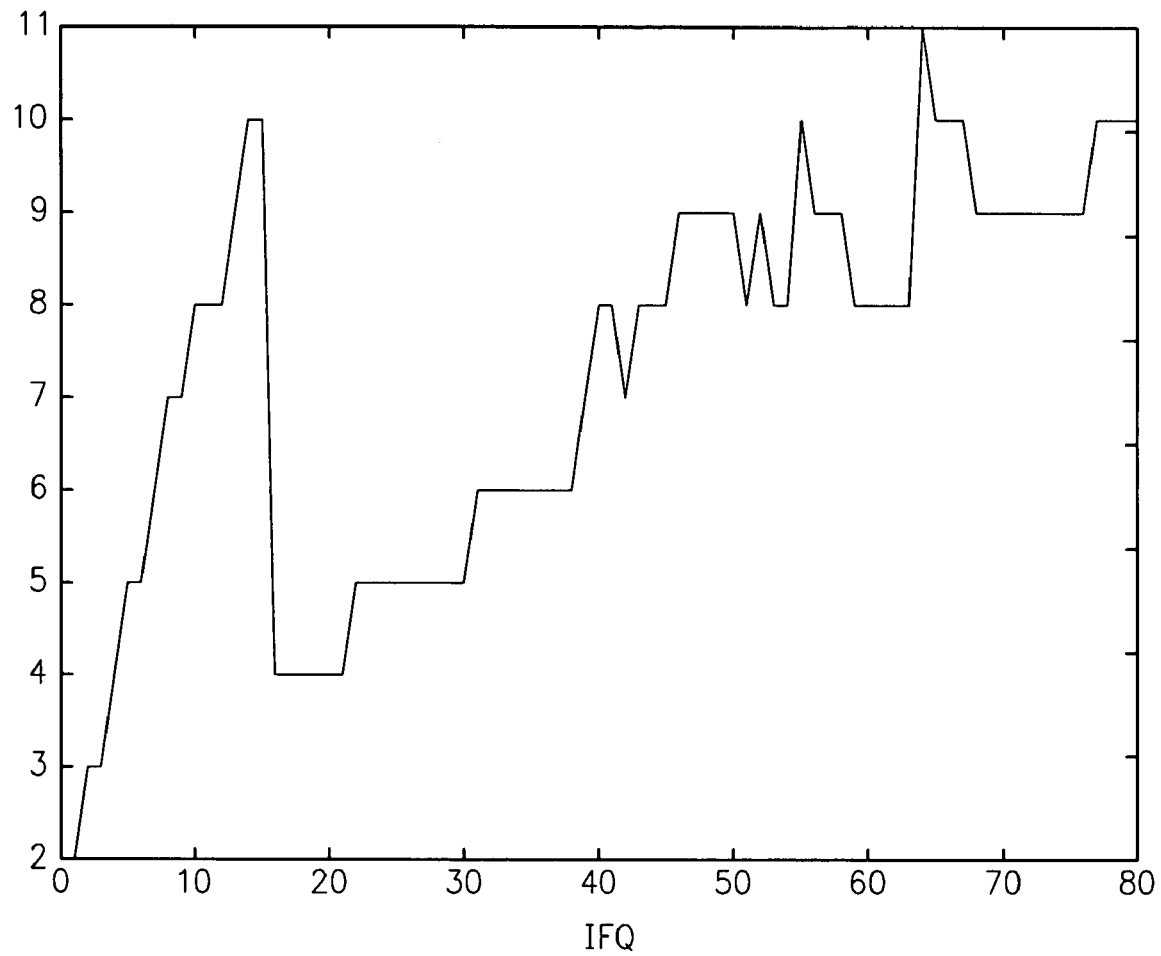
FIG. 17 graphically illustrates a second convergence for inner GMRES iterations for the model of FIG. 9.

At least one thing is presently known which affects the rate of convergence. When the velocity contrast between layers is larger, the magnitude of the refractive index variation is also larger, leading to a slower rate of convergence. FIG. 17 shows the number of iterations required for convergence for the step model of FIG. 9, where the sound speed of the bottom layer is set to 4000 ms$^{-1}$ for the simulation. Confirmation of the reduced rate of convergence is obtained simply by comparing FIG. 17 with FIG. 13.

Once the model has been created and the acoustic wave equation for that model has been solved in the manner described above, those skilled in the art will appreciate that the model and solution can be used to create sample data for the model. This sample data is created using techniques that are familiar to and already used by the skilled artesian. The sample data, once created, may be stored within an electronic memory for later comparison with actual data collected from the mass being modeled to determine the accuracy of the model.

Thus, a method of generating sample data from a computerized model of a mass using acoustic simulations is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of generating sample data from a computerized model of a mass using acoustic simulations, the method comprising:
    creating a computerized model of the mass;
    dividing the computerized model into a plurality of layers, one or more of the layers representing physical features of the mass;
    characterizing each layer by a propagation wavenumber;
    solving acoustic wave equations for the layered model using a multi-level generalized minimal residual (GMRES) algorithm, the multi-level GMRES algorithm including an inner GMRES algorithm, employing one of a layered medium preconditioner or a forward-backward two-equation lower block triangular preconditioner, and an outer GMRES algorithm, employing a variable-width three-band subdomain lower block triangiular preconditioner;
    simulating sample acoustic data using the solved wave equations;
    and storing the sample acoustic data in an electronic memory.

2. The method of claim 1, wherein at least one of the inner GMRES algorithm or the outer GMRES algorithm is repeatedly applied.

3. The method of claim 2, wherein an initial application of the inner GMRES algorithm generates a set of orthogonal vectors for an equation matrix, and the set of orthogonal vectors is used during all subsequent applications of the inner GMRES algorithm.

4. The method of claim 1, wherein the inner GMRES algorithm is spatial frequency dependent.

5. A method of generating sample data from a computerized model of a mass using acoustic simulations, the method comprising:
    creating a computerized model of the mass;
    dividing the computerized model into a plurality of layers, one or more of the layers representing physical features of the mass;
    characterizing each layer by a propagation wavenumber;
    solving acoustic wave equations for the layered model using an inner generalized minimal residual (GMRES) algorithm and an outer GMRES algorithm, wherein the outer GMRES algorithm employs a variable-width three-band subdomain lower block triangular preconditioner and the inner GMRES algorithm employs one of a layered medium preconditioner or a forward-backward two-equation lower block triangular preconditioner;
    simulating sample acoustic data using the solved wave equations;
    and storing the sample acoustic data in an electronic memory.

6. The method of claim 5 wherein at least one of the inner GMRES algorithm or the outer GMRES algorithm is repeatedly applied.

7. The method of claim 6 wherein an initial application of the inner GMRES algorithm generates a set of orthogonal vectors for an equation matrix, and the set of orthogonal vectors is used during all subsequent applications of the inner GMRES algorithm.

8. The method of claim 5 wherein the inner GMRES algorithm is spatial frequency dependent.

* * * * *